(12) United States Patent
Henderson

(10) Patent No.: US 7,620,077 B2
(45) Date of Patent: Nov. 17, 2009

(54) APPARATUS AND METHOD FOR PUMPING AND OPERATING OPTICAL PARAMETRIC OSCILLATORS USING DFB FIBER LASERS

(75) Inventor: Angus J. Henderson, Seattle, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/484,358

(22) Filed: Jul. 10, 2006

(65) Prior Publication Data

US 2007/0035810 A1      Feb. 15, 2007

Related U.S. Application Data

(60) Provisional application No. 60/697,787, filed on Jul. 8, 2005.

(51) Int. Cl.
*H01S 3/30* (2006.01)
(52) U.S. Cl. ............................................. 372/6; 372/69
(58) Field of Classification Search ...................... 372/6, 372/69

See application file for complete search history.

(56) References Cited

U.S. PATENT DOCUMENTS

| | | | |
|---|---|---|---|
| 4,829,532 A | 5/1989 | Kane | |
| 5,377,043 A * | 12/1994 | Pelouch et al. | 359/326 |
| 5,847,861 A * | 12/1998 | Kafka et al. | 359/330 |
| 6,301,273 B1 * | 10/2001 | Sanders et al. | 372/6 |
| 6,654,392 B1 | 11/2003 | Arbore et al. | |
| 7,079,557 B1 * | 7/2006 | Yin et al. | 372/22 |
| 2002/0076156 A1 * | 6/2002 | Kringlebotn et al. | 385/37 |
| 2002/0176472 A1 * | 11/2002 | Arbore et al. | 372/72 |
| 2007/0153839 A1 * | 7/2007 | Varming et al. | 372/6 |

OTHER PUBLICATIONS

Henderson, Angus, etal , "Low threshold, singly-resonant CW OPO pumped by an all-fiber pump source", "Optics Express", Jan. 3, 2006, pp. 767-772, vol. 14, No. 2.

Lindsay, I. D., etal , "110GHz rapid, continuous tuning from an optical parametric oscillator pumped by a fiber-amplified DBR diode laser", "Optics Express", Feb. 21, 2005, pp. 1234-1239, vol. 13, No. 4.

(Continued)

*Primary Examiner*—Dung T Nguyen
(74) *Attorney, Agent, or Firm*—Charles A. Lemaire; Lemaire Patent Law Firm, P.L.L.C.

(57) ABSTRACT

An optical parametric oscillator (OPO) is described that efficiently converts a near-infrared laser beam to tunable mid-infrared wavelength output. In some embodiments, the OPO includes an optical resonator containing a nonlinear crystal, such as periodically-poled lithium niobate. The OPO is pumped by a continuous-wave fiber-laser source having a low-power oscillator and a high-power amplifier, or using just a power oscillator). The fiber oscillator produces a single-frequency output defined by a distributed-feedback (DFB) structure of the fiber. The DFB-fiber-laser output is amplified to a pump level consistent with exceeding an oscillation threshold in the OPO in which only one of two generated waves ("signal" and "idler") is resonant within the optical cavity. This pump source provides the capability to tune the DFB fiber laser by straining the fiber (using an attached piezoelectric element or by other means) that allows the OPO to be continuously tuned over substantial ranges, enabling rapid, wide continuous tuning of the OPO output frequency or frequencies.

28 Claims, 13 Drawing Sheets

OTHER PUBLICATIONS

McConnell, Gail, etal., "Simultaneous stimulated Raman scattering and second harmonic generation in periodically poled lithium niobate", "Optics Express", Mar. 21, 2005, pp. 2099-2104, vol. 13, No. 6.

Arbore, M. A., et al., "Frequency Doubling of Femtosecond Erbium-Fiber Soliton Lasers in Periodically Poled Lithium Niobate", "Optics Letters", Jan. 1, 1997, pp. 13-15, vol. 22, No. 1.

Bortz, M. L., et al., "Measurement of the Second-Order Nonlinear Susceptibility of Proton-Exchanged LiNbO3", "Optics Letters", May 1992, pp. 704-706, vol. 17.

Brener, I., et al., "160Gbit/s wavelength shifting and phase conjugation using periodically poled LiNbO3 waveguide parametric converter", "Electronics Letters", Oct. 12, 2000, pp. 1788-1790, vol. 36, No. 21.

Charbonneau-Lefort, M., et al., "Tandem chirped quasi-phase-matching grating opt. parametric amp. design for simultaneous group delay and gain control", "Optics Letters", Mar. 15, 2005, pp. 634-636, vol. 30, No. 6.

Fejer, Martin M., "Nonlinear Optical Frequency Conversion", "Physics Today", May 1994, pp. 25-32, vol. 47.

Galvanauskas, A., et al., "Fiber-Laser-Based Femtosecond Parametric Generator in Bulk Periodically Poled LiNbO3", "Optics Letters", Jan. 15, 1997, pp. 105-107, vol. 22, No. 2.

Imeshev, G., et al., "Phase Correction in Double-Pass Quasi-Phase-Matched Second-Harmonic Generation with a Wedged Crystal", "Optics Letters", Feb. 1, 1998, pp. 165-167, vol. 23, No. 3.

Lim, E. J., et al., "Quasi-Phasematched Frequency Conversion in Lithium Niobate and Lithium Tantalate Waveguides", "SPIE Proceedings on Inorganic Crystals for Optics, Electro-Optics, and Frequency Conversion", 1991, pp. 135-142, vol. 1561.

Lodenkamper, R., et al., "Surface Emitting Second Harmonic Generation in a Vertical Cavity Resonator", "Electonics Letters", Sep. 26, 1991, pp. 1882-1884, vol. 27, No. 20.

Matsumoto, S., et al., "Quasiphase-Matched Second Harmonic Generation of Blue Light in a Electrically Periodically-Poled Li Tantalate Waveguides", "Electronics Letters", Oct. 24, 1991, pp. 2040-2041, vol. 27, No. 22.

Mueller, M., et al., "Investigation of periodically poled lithium niobate crystals by light diffraction", "Journal of Applied Physics", Jan. 20, 2005, pp. 1-4, vol. 97, No. 044102.

Myers, L. E., et al., "CW Diode-Pumped Optical Parametric Oscillator in Bulk Periodically Poled LiNbO3", "OSA Proceedings on Advanced Solid-State Lasers", Jan. 30, 1995, pp. 57-59, vol. 24, Publisher: Optical Society of America, Washington, D.C.

Myers, Lawrence E., et al., "CW Single-Resonant Optical Parametric Oscillators Based on 1.064-um-Pumped Periodically Poled LiNbO3", "OSA TOPS on Advanced Solid-State Lasers", 1996, pp. 35-37, vol. 1, Publisher: Optical Society of America, Washington, D.C.

Myers, L. E., et al., "Quasi-Phasematched Optical Parametric Oscillators in Periodically Poled LiNbO3", "Optics and Photonics News", Dec. 1995, pp. 30-31, vol. 6, No. 12.

Roussev, Rostislav R., et al., "Periodically poled LiNbO3 waveguide sum-freq. generator for efficient single-photon detection at comm. wavelengths", "Optics Letters", Jul. 1, 2004, pp. 1518-1520, vol. 29, No. 13.

Spielman, S., et al., "Measurement of the Spontaneous Polar Kerr Effect in YBa2Cu3O7 and Bi2Sr2CaCu2O8", "Physical Review Letter", Jun. 8, 1992, pp. 3472-3475, vol. 68, No. 23.

Bosenberg, Walter R., et al., "93% pump depletion, 3.5-W continuous-wave, singly resonant optical parametric oscillator", "Optics Letters", Sep. 1, 1996, pp. 1336-1338, vol. 21, No. 17.

Byer, R. L., "Optical Parametric Oscillators", "Treatise in Quantum Mechanics", 1975, pp. 587-702, Publisher: Academic Press, New York.

Chen, Da-Wun, et al., "Low noise 10-W cw OPO generation near 3 um with MgO doped PPLN", "postdeadline paper CThQ2 in Conference on Lasers and Electro-Optics", 2005.

Fejer, M. M,, "Nonlinear Frequency Conversion in Periodically-Poled Ferroelectric Waveguides", "Guided Wave Nonlinear Optics", 1992, pp. 133-145, Publisher: Kluwer Academic Publishers, Dordrecht.

Fejer, M. M., et al., "Quasi-phase-matched interactions in lithium niobate", "SPIE Proceedings on Nonlinear Optical Properties of Materials", 1989, vol. 1148, Publisher: SPIE, Washington.

Fejer, Martin M., et al., "Quasi-Phase-Matched Second Harmonic Generation: Tuning and Tolerances", "IEEE Journal of Quantum Electronics", Nov. 1992, pp. 2631-2654, vol. 28, No. 11.

Gross, P., et al., "Fiber-laser-pumped continuous-wave singly resonant optical parametric oscillator", "Optics Letters", Mar. 15, 2002, pp. 418-420, vol. 27, No. 6.

Jeong, Y., et al., "Single-freq. single-mode plane-polarized ytterbium-doped fiber master-osc. power amplifier source with 264W output power", "Optics Letters", Mar. 1, 2005, pp. 459-461, vol. 30, No. 5.

Jundt, D. H., et al., "Periodically poled LiNbO3 for high efficiency second-harmonic generation", "Appl. Phys. Lett.", Nov. 18, 1991, pp. 2657-2659, vol. 59, No. 21.

Klein, M. E., et al., "Diode-pumped singly resonant CW optical parametric osc. with wide continuous tuning of the near-infrared idler wave", "Optics Letters", Apr. 1, 2000, pp. 490-492, vol. 25, No. 7.

Kreuzer, L. B., "Single and multimode oscillation of the singly resonant optical parametric oscillator", "Proceedings of the joint conference on lasers and Opto-electronics", 1969, pp. 52-63, Publisher: Institution of Electronic and Radio Engineers, London.

Lowenthal, Dennis D., "CW periodically poled LiNbO3 optical parametric oscillator model with strong idler absorption", "IEEE Journal of Quantum Electronics", Aug. 1998, pp. 1356-1366, vol. 34, No. 8.

Magel, G. A., et al., "Second Harmonic Generation in Periodically-Poled LiNbO3", "Optics News", Dec. 1989.

Pasiskevicius, V., et al., "Enhanced stimulated Raman scattering in optical parametric oscillators from periodically poled KTiOPO4", "Applied Physics Letters", Jan. 20, 2003, pp. 325-327, vol. 82, No. 3.

Persijn, S.T., et al., "Spectroscopic Applications of a Broadly Tunable, Continuous-Wave Optical Parametric Oscillator", "Postdeadline paper PDP-6, Postdeadline proceedings of Laser Applications in Chemical, Security, and Environmental Analysis", 2006, Publisher: Optical Society of America.

Shikata, J., et al., "CARS spectroscopy of THz-frequency optical phonons in single-domain and periodically poled LiNbO3 crystals", "Annual report, 2002, Ito Laboratory Research Institute of Electrical Communication Tohoku University", 2002.

Van_Herpen, M.M.J.W., et al., "Tuning and stability of a continuous-wave mid-infrared high-power single resonant optical parametric oscillator", "Appl. Phys. B", 2002, pp. 329-333, vol. 75.

Yang, S. T., et al., "Continuous-wave singly resonant optical parametric oscillator pumped by a single-freq. resonantly doubled Nd:YAG laser", "Optics Letters", Jun. 15, 1993, pp. 971-973, vol. 18, No. 12.

* cited by examiner

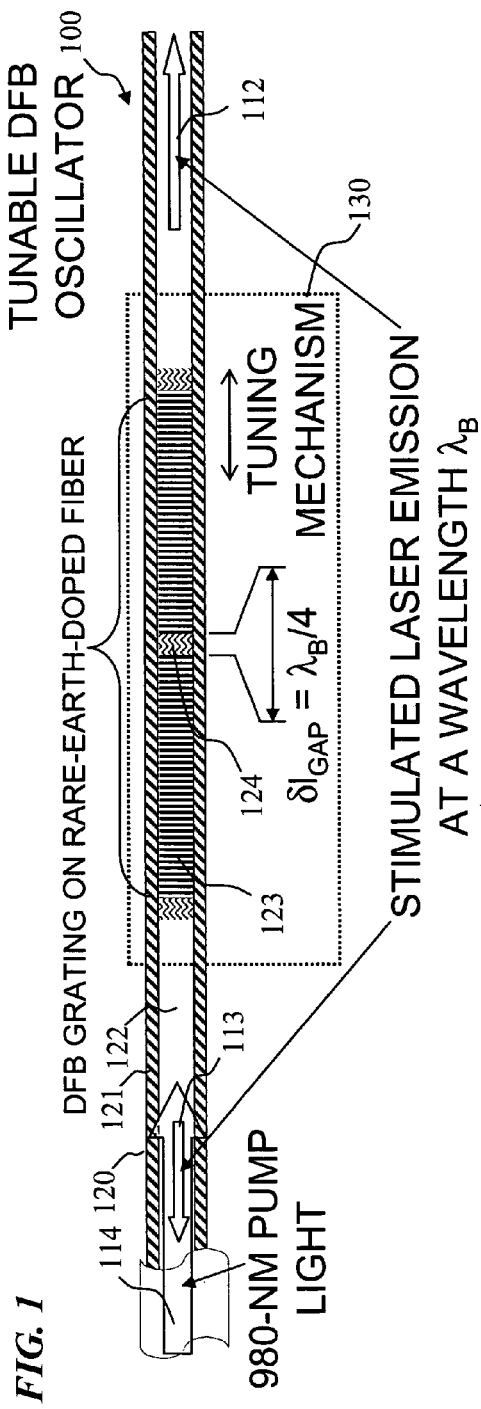
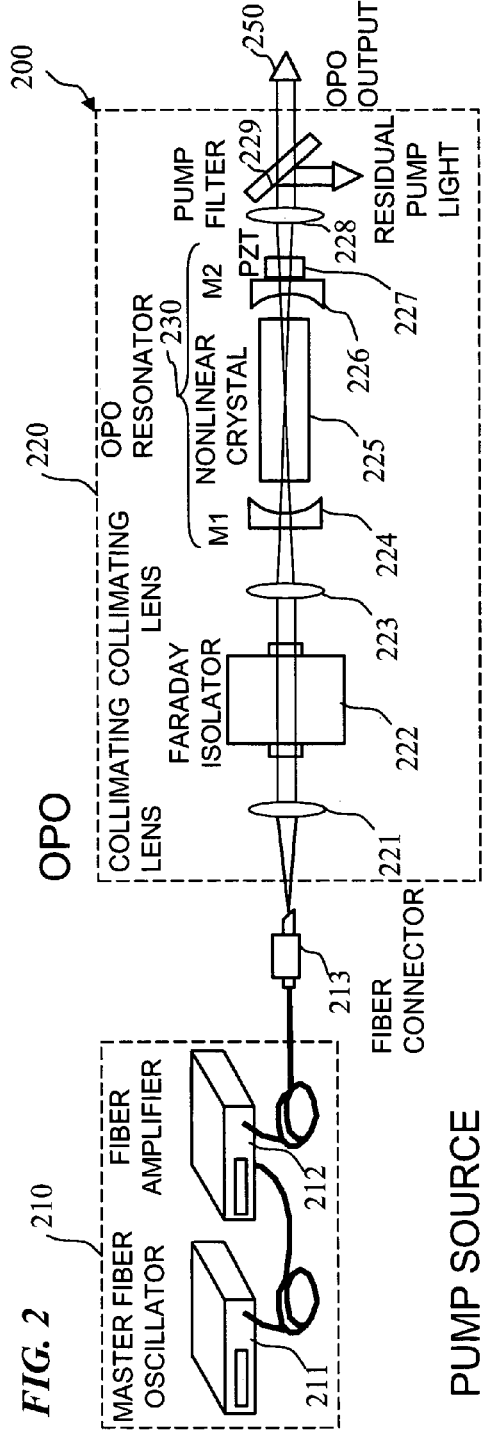
*FIG. 1*
*FIG. 2*

1800

1801

1802

APPARATUS AND METHOD FOR PUMPING AND OPERATING OPTICAL PARAMETRIC OSCILLATORS USING DFB FIBER LASERS

RELATED INVENTIONS

This claims priority to U.S. Provisional Patent Application 60/697,787 filed Jul. 8, 2005 entitled "APPARATUS AND METHOD FOR PUMPING OPTICAL PARAMETRIC OSCILLATORS USING DFB FIBER LASERS", which is hereby incorporated by reference in its entirety.

STATEMENT REGARDING FEDERALLY SPONSORED RESEARCH OR DEVELOPMENT

This invention was made with Government support under Contract no. F29601-03-C-0191 awarded by the Air Force Research Laboratory, Kirtland AFB, N. Mex. The Government has certain rights in the invention.

FIELD OF THE INVENTION

The invention relates generally to lasers and nonlinear optical frequency conversion and more particularly to methods and apparatus applicable for optical parametric oscillators.

BACKGROUND OF THE INVENTION

Optical parametric oscillators (OPOs) provide an efficient way of converting short-wavelength electromagnetic radiation from coherent-light sources to long wavelengths, while also adding the capability to broadly tune the output wavelength. In general, an OPO system principally includes a short-wavelength laser source and an optical resonator (resonant optical cavity) containing a nonlinear crystal. In some embodiments, additional components include mode-matching optics and an optical isolator.

In general, the OPO operates with three overlapping light beams—an input pump beam having the shortest wavelength (typically, this is coherent light from a laser), and two longer-wavelength beams generated in the OPO called the signal beam and the idler beam. By convention, the shorter-wavelength beam is called the signal beam, and the longer-wavelength beam is called the idler beam. Depending on the application, either the signal beam or the idler beam, or both, will be the output light utilized by other components. The energy of photons in the pump beam (proportional to 1/wavelength) will equal the sum of the energy of photons in the signal beam plus the energy of photons in the idler beam. The pump beam (i.e., excitation light from the short-wavelength laser source) is focused, using the mode-matching optics, through the optical isolator and into the resonant optical cavity, passing through the nonlinear crystal. Parametric fluorescence generated within the nonlinear material is circulated within the resonant cavity and experiences optical gain. When the OPO is excited by a pump-power-per-unit-area above a certain threshold, oscillation occurs, and efficient conversion of pump photons to signal and idler photons occurs. Different configurations of OPOs are possible. Variables include the wavelengths which are resonant within the optical cavity (pump and/or signal and/or idler) and the type of resonator (ring versus linear).

U.S. Pat. No. 6,654,392 issued Nov. 25, 2003 to Arbore et al. entitled "QUASI-MONOLITHIC TUNABLE OPTICAL RESONATOR," which is hereby incorporated herein by references describes an optical resonator having a piezoelectric element attached to a quasi-monolithic structure that defines an optical path. Mirrors attached to the structure deflect light along the optical path. The piezoelectric element controllably strains the quasi-monolithic structure to change a length of the optical path by about 1 micron. A first feedback loop coupled to the piezoelectric element provides fine control over the cavity length. The resonator may include a thermally actuated spacer attached to the cavity and a mirror attached to the spacer. The thermally actuated spacer adjusts the cavity length by up to about 20 microns.

A monolithic resonator typically includes a single block of transparent material having reflecting facets that serve as the mirrors. Usually, the material is strained by changing its temperature. U.S. Pat. No. 4,829,532 issued May 9, 1989 to Kane, which is hereby incorporated herein by reference, describes an alternative where the optical path length of a monolithic oscillator can be adjusted by a piezoelectric element mounted to uniformly strain the entire block in a plane parallel to the plane of the optical path.

After tuning by one free-spectral range of a conventional OPO cavity, the OPO frequency will discontinuously jump by one or more longitudinal-mode spacing of the cavity (this discontinuous jump is called a mode hop). In view of shortcomings in such conventional devices, there is a need for devices that can provide continuous, mode-hop-free wavelength tuning by hundreds of GHz using a straightforward, reliable mechanism, while also supplying other desirable operating characteristics including linear polarization, a power level of several Watts, narrow bandwidth, and/or diffraction-limited beam quality.

SUMMARY OF THE INVENTION

In some embodiments, the invention provides an optical-parametric oscillator (OPO) configured to be pumped by a tunable fiber laser. In some embodiments, the idler wave is the output and the signal wavelength in the OPO resonator is maintained at a fixed value (i.e., the signal wavelength is a resonant wavelength in the OPO resonator), such that when the wavelength from the tunable fiber laser changes, the output idler wavelength also changes such that the energy of the idler photons equals energy of the pump photons minus the energy of the signal photons. In other embodiments, the signal wave is the output and the idler wavelength in the OPO resonator is maintained at a fixed-wavelength value (i.e., the idler wavelength is a resonant wavelength in the OPO resonator), such that when the wavelength from the tunable fiber laser changes, the output signal wavelength also changes such that the energy of the signal photons equals energy of the pump photons minus the energy of the idler photons.

In some embodiments, the OPO is configured in a bow-tie arrangement having its four mirrors highly reflective (e.g., 99.9% reflectivity) at the resonant wavelength (e.g., the OPO is resonant at the signal wavelength if the idler wavelength is the primary output signal, or the OPO is resonant at the idler wavelength if the signal wavelength is the primary output signal), in order to reduce the threshold pump power needed to obtain and sustain optical-parametric oscillation. In some embodiments, such a configuration causes a very large and undesirable buildup of power circulating within the OPO, particularly at the resonant wavelength (e.g., at the signal wavelength, if that is the resonant wavelength), which causes undesirable heating, particularly of the non-linear element (e.g., Mg:O-doped PPLN (magnesium-oxide-doped periodically-poled lithium niobate), in some embodiments). For example, a reasonably efficient embodiment can achieve 60% to 80% of the pump power converted to signal and idler wavelengths, and if only 0.1% of the resonant wavelength is lost (e.g., absorbed or transmitted) at each of the four mirrors, the OPO cavity pumped with only 15 Watts of pump power can build up to a kilowatt or more of circulating power at the resonant wavelength (e.g., the signal wavelength, if that is the resonant wavelength, while three to four Watts of idler-wavelength light is output). Even if only a very small percentage of the 1.0-kW signal wavelength is absorbed in the non-linear element, that absorbed power can be several Watts, which can cause significant heating of the non-linear element and introduce undesirable non-linear effects such as Ramon scattering and/or other broadening of the output wavelength signal.

Accordingly, in other embodiments, a means is introduced into the cavity for removing a few percent (e.g., one to five percent) of the resonant wavelength each round trip (e.g., by replacing one or more of the mirrors that were highly reflective at the resonant wavelength by mirrors that transmit the few percent (e.g., one to five percent) at the resonant wavelength, or by adding a wavelength-selective beamsplitter (e.g., a dichroic mirror) within the cavity's beam path to extract a suitable amount of the resonant wavelength (which, in some embodiments, can be used for other useful purposes). For example, in some embodiments, a diode-pumped fiber laser (e.g., 1064 nm) is used as the 15-Watt pump source for a Mg:O-doped PPLN OPO. When four mirrors are all highly reflective (e.g., 99.9% reflectivity) at the resonant wavelength (e.g., a signal wavelength of about 1650 nm), the OPO threshold power was low at about 1.5 Watts, and with 15 Watts pump power input, about 3.5 Watts of idler-wavelength power (at a wavelength of about 3000 nm) is output, but the PPLN crystal incurs a temperature rise of up to 30 degrees Celsius (to 50 degrees or more from 26 degrees ambient) (since each mirror outputs about 210 milliwatts of signal wavelength power, the circulating signal power builds to 0.9 kW or more). Under these conditions significant broadening of the signal wavelength spectrum was observed, and even Raman shifting of the signal. In some embodiments, when one of the mirrors is changed to transmit 3% of the signal wavelength, the threshold power needed for OPO oscillation is deliberately increased to about 5.8 Watts, but when pumping at about 15 Watts of pump power, nearly the same idler power (nearly 3.5 Watts) is output, while 5.1 Watts of signal power is output (or otherwise extracted from the cavity), thus achieving a 60% conversion efficiency while reducing the PPLN temperature to about two to three degrees above ambient.

In some embodiments, the oscillation threshold is adjusted (typically increased for high pump powers) such that the operating pump power is at 2.5 times the oscillation threshold, in order to achieve relatively high conversion efficiency and simultaneously relatively low undesirable non-linear effects, such as Ramon shifting of the output wavelength.

In some embodiments, the invention provides a fiber-laser pump source that includes a distributed-feedback fiber laser and a fiber amplifier in a master-oscillator/power-amplifier configuration, wherein a relatively small-power coherent optical signal is generated and tunable in the master oscillator, and is then amplified by the power amplifier, which outputs this as the pump signal taken as input by the OPO.

In other embodiments, the invention provides a fiber-laser pump source that includes a tunable fiber power oscillator, wherein a relatively high-power coherent optical signal is generated and tunable in the power oscillator, which outputs this as the pump signal taken as input by the OPO.

In some embodiments, the invention provides an apparatus that includes an optical parametric oscillator in which only one of the signal, idler, or pump waves is resonant. In other embodiments, the invention provides an apparatus that includes an optical parametric oscillator in which two of the signal, idler, or pump wavelengths are resonant. In still other embodiments, the invention provides an apparatus that includes an optical parametric oscillator in which all three waves—signal, idler, and pump—are resonant.

In some embodiments, the invention provides a method that includes tuning a fiber-laser-pumped optical parametric oscillator by continuous mode-hop-free tuning of the fiber laser.

In some embodiments, the invention provides a method for tuning a fiber laser that includes providing a distributed-feedback (DFB) fiber laser, wherein the DFB is tuned by various mechanisms, such as, for example, a piezoelectric transducer (PZT), heat and/or other mechanisms. In some embodiments, the DFB is separate from the fiber, such as one or more DFBs on a waveguide on a slab that is coupled to the fiber.

In some embodiments, the invention provides a method for tuning a fiber laser that includes providing a DFB fiber laser, applying a variable voltage to a piezoelectric transducer attached to the DFB fiber laser in order to change a characteristic wavelength of the DFB, and/or varying the temperature of the fiber in order to change a characteristic wavelength of the DFB laser. In some embodiments, a tunable diode laser is used to generate variable-frequency coherent light, wherein the frequency is tuned by varying the injection current.

In some embodiments, the invention provides a method that includes providing an OPO resonator, and stabilizing the OPO output amplitude by servo-controlling the OPO resonator's length to maintain resonance of the OPO resonator on a specific longitudinal mode of pump, signal and/or idler wavelength.

In some embodiments, the invention provides a method for tuning the OPO output frequencies that includes providing one or more OPO-cavity mirrors, at least one of which has an attached piezoelectric element, and driving the piezoelectric element to stabilize the OPO amplitude. Note: this is an alternative of tuning the OPO to the method which is central to some embodiments of this invention. It does not require the tuning of the fiber laser.

BRIEF DESCRIPTION OF THE FIGURES

FIG. 1 is a block diagram of a distributed-feedback fiber laser 100 having a tuning mechanism.

FIG. 2 is a block diagram of a system 200 having a two-mirror OPO pumped by a fiber laser.

DETAILED DESCRIPTION

Figure 3A:
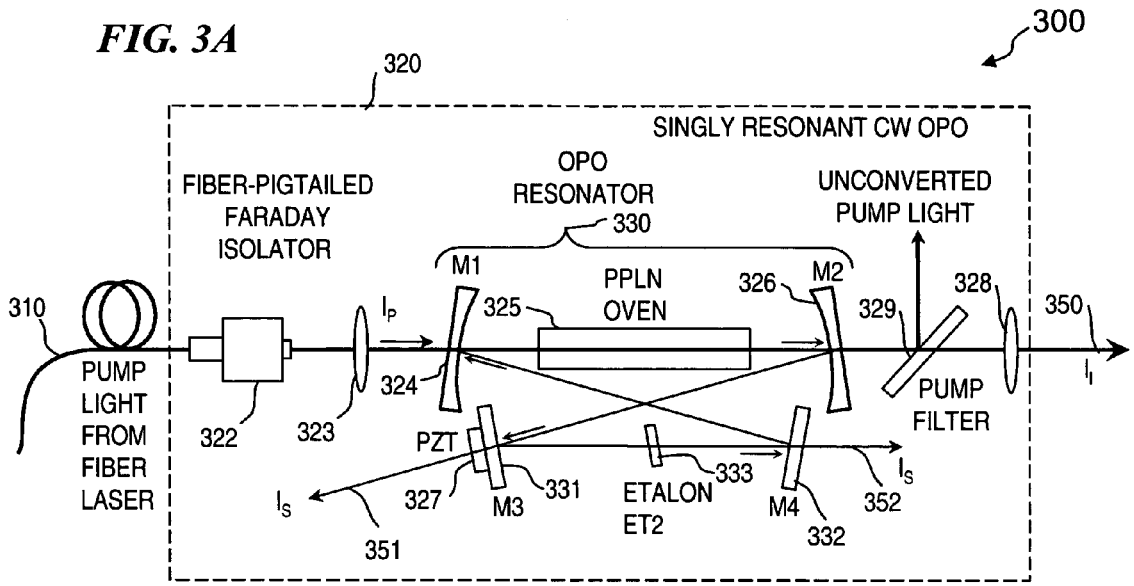
FIG. 3A is a block diagram of an alternative four-mirror bow-tie OPO cavity design 300.

Although the following detailed description contains many specifics for the purpose of illustration, a person of ordinary skill in the art will appreciate that many variations and alterations to the following details are within the scope of the invention. Accordingly, the following preferred embodiments of the invention is set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

An optical parametric oscillator can resonate one or both of the signal and idler wavelengths within its cavity, and furthermore can also resonate the pump wavelength. In the case of all wavelengths being resonant (signal, idler, and pump wavelengths), the device is known as a triply resonant oscillator (TRO). A device with both signal and idler wavelengths resonant is known as a doubly resonant oscillator (DRO), while if pump wavelength and one or other of signal or idler wavelengths is resonant, it is called a pump-enhanced or pump-resonant singly resonant OPO.

The configuration that provides the simplest operation is that in which only signal or idler wavelength is resonant within the cavity. This is a singly resonant oscillator (SRO). Such devices remove the highly-constrained requirement to precisely match the cavity length to an integral number of half wavelengths of a plurality of different wavelengths. Hence, continuous tuning of the OPO signal and idler wavelengths can straightforwardly be obtained in SROs.

Over a restricted range, SROs may be continuously tuned by simply changing the resonator cavity length (for example, by activating a piezoelectric element (PZT) on one or more of the cavity's mirrors). However, after tuning by one free-spectral range of the cavity, the OPO frequency will discontinuously jump by one or more longitudinal-mode spacing of the cavity (this discontinuous jump is called a mode hop). For applications including spectroscopy, it is imperative to maintain truly continuous tuning without the occurrence of such mode hops. This can be achieved through a mechanism that adjusts the resonant wavelength of lowest optical loss synchronously with the wavelength defined by the cavity length (and hence the usefulness of the PZT adjustment). Again, this refers to the alternate method of tuning the fiber laser—this is a method that does not require the fiber laser tuning.

An alternative method of tuning the OPO continuously is to fix the resonant wavelength by the inclusion of a frequency-selective element (for example, a solid Fabry-Perot etalon) within the resonant cavity, and to provide tuning of the non-resonant wavelength by continuously tuning the pump laser. In some embodiments, the etalon is omitted, and the cavity is tuned by careful control of the length of the optical path.

It has been demonstrated that this tuning method can provide wide, straightforward continuous tuning of an OPO. The extent of the tuning enabled in the OPO is primarily defined by the extent of tuning available from the pump source. Hence, in selecting a pump source for a singly resonant OPO, one of the major requirements is to obtain simple, wide, mode-hop-free tuning of the pump wavelength. Laser sources that have been used to pump continuous-wave (CW) OPOs include gas lasers, diode-pumped and lamp-pumped crystalline lasers (e.g., Nd:YAG (neodymium yttrium aluminum garnet)), semiconductor lasers and fiber lasers. In the case of gas and crystalline lasers, the narrow gain profile of these systems restricts the range of tuning that can be obtained. In lasers that provide wider gain, such as vibronic lasers (e.g., Ti:Sapphire), wider tuning is possible. However, such lasers require similar synchronous frequency control to that described above. Hence, such systems are generally quite complex. Semiconductor diode lasers do provide continuous tuning, but this is generally obtained by varying the applied current, with output power undesirably changing simultaneous with the desired change in frequency. In general, diode lasers will also mode-hop after tuning by tens of GHz.

In some embodiments, the present invention provides a continuous-wave optical parametric oscillator whose output frequency can be widely tuned without mode hops, by use of a tunable fiber-laser pump source. These advantages are attained by using a continuous-wave distributed-feedback (DFB) fiber laser as a primary source for a pump-laser system for a continuous-wave optical parametric oscillator. With sufficient power output, the DFB fiber laser can be used on its own as the OPO pump source, or alternatively it can be used as the seed source for a master-oscillator power-amplifier fiber-laser system, which is then used as the pump laser for the OPO.

In some embodiments, the distributed-feedback fiber laser operates on a single longitudinal mode of its optical resonator, and produces linearly-polarized output. The resonator is formed using a length of gain fiber into which a phase-shifted Bragg reflector is written, in order to provide feedback at a well-defined single wavelength. The operating wavelength of the resonator can be varied continuously (without mode-hops) by changing the fiber temperature. Tuning ranges in excess of 1 nm in wavelength (which corresponds to approximately 300 GHz) are possible using this method at an operating wavelength of 1.08 micrometers. The output beam from the DFB fiber oscillator is coupled into a polarization-maintaining fiber amplifier. The amplifier produces a linearly polarized output beam of near-diffraction-limited beam quality, and sufficient output power to enable a continuous-wave optical parametric oscillator to reach oscillation threshold.

The output beam from the fiber laser is shifted in wavelength by coupling it into an optical resonator containing a nonlinear optical crystal. This resonator forms an optical parametric oscillator. By varying the operating frequency of the fiber laser pump source, by either or both of the methods above, the operating frequency of the OPO may be tuned. The specific tuning characteristics of the OPO are dependent upon its configuration. Using the appropriate OPO configuration, the full tuning range demonstrated by the fiber pump source may be replicated by the output of the OPO, without mode-hops.

An OPO Pumped by a Distributed-Feedback Fiber Laser

FIG. 1 is a block diagram of a distributed-feedback fiber laser 100 having a tuning mechanism. In some embodiments, the present invention provides an optical parametric oscillator having continuous tuning that is enabled by using a distributed-feedback fiber laser as its pump source. One embodiment of such a distributed feedback fiber laser 100 includes an optical fiber 120 having a core 122 and one or more cladding layers 121. In some embodiments, a portion of fiber 120 includes a distributed feedback grating 123 having a gap 124 that has a length $\delta 1_{GAP} = \lambda_B/4$, or $\lambda_B(N+0.25)$ where N is an integer. In some embodiments, a tuning mechanism (such as, for example, a PZT and/or a heating element used to stretch the length of grating 123 and/or gap 124) is used to change the wavelength of the laser light output of DFB fiber laser 100.

FIG. 2 is a block diagram of a system 200 having a two-mirror OPO pumped by a fiber laser. In some embodiments, system 200 includes a pump laser 210 and an OPO 220. In some embodiments, pump laser 210 includes a master oscillator 211 (e.g., a DFB tunable fiber laser, in some embodiments) and an optical power amplifier 212, while in other embodiments, only master oscillator 211 (e.g., a powerful DFB tunable fiber laser) is used, when that provides sufficient laser pump light power by itself. In some embodiments, fiber connector 213 connects pump laser 210 to OPO 220. In some embodiments, OPO 220 includes a first collimating lens 221, a Faraday isolator 222, and a second collimating lens 223 that together condition the pump light for injection into OPO resonator 230, which, in some embodiments, is tuned (e.g., by PZT 227 moving mirror 226 to adjust the length of the OPO cavity between input mirror 224 and output mirror 226) to resonate at the signal wavelength (and/or the idler wavelength and/or the pump wavelength). In some embodiments, the signal wavelength is kept at a fixed wavelength, such that as the pump wavelength is changed, the idler wavelength of the output light 250 is also changed. In some embodiments, a non-linear crystal 225 (such as, e.g., periodically poled lithium niobate (PPLN)) is used to convert the pump-wavelength light (having the shortest wavelength) into signal-wavelength light (having a wavelength between that of the pump wavelength and that of the idler wavelength) and idler-wavelength light (having the longest wavelength). In some embodiments, M2 mirror 226 is wavelength-selective such that it passes idler light and perhaps some pump light. In some embodiments, wavelength-selective mirror 229 removes the pump light (directed downward) and passes idler light 250 as output to the right. The OPO resonator cavity 230 is generally desired to resonate at only a single wavelength (e.g., the signal wavelength if idler-wavelength light is the primary output (for example, the longer wavelength is the tunable wavelength that is output), or the idler-wavelength if signal-wavelength light is the primary output (for example, the shorter wavelength is the tunable wavelength that is output)). In some embodiments, all mirrors are made substantially transparent or non-reflective at the pump wavelength and the output wavelength, in order that those wavelengths do not become resonant in the cavity (if two or more wavelengths become resonant, then wavelength and/or amplitude instabilities ensue since power may shift between the resonant wavelengths). To avoid such instabilities, some (or most) embodiments of the present invention are designed to resonate at a single wavelength, and some or all of the mirrors are designed to transmit other wavelengths that may arise.

FIG. 3A is a block diagram of system 300 using an alternative four-mirror bow-tie OPO cavity design. In some embodiments, OPO 320 accepts input pump light from fiber 310 (coming from a tunable DFB fiber laser, not shown), and includes a fiber-pigtail-input Faraday isolator 322, and a collimating lens 323 that together condition the pump light for injection into OPO resonator 330, which, in some embodiments, is tuned (e.g., by PZT 327 moving mirror 331 to adjust the length of the OPO cavity between input mirror 324 and itself by way of output mirror 326, movable mirror 331, and mirror 332) to resonate at the signal wavelength (and/or the idler wavelength and/or the pump wavelength). In some embodiments, an etalon 333 that passes just the signal wavelength is also or alternatively used to tune the resonant OPO signal wavelength. In some embodiments, the signal wavelength is kept at a fixed wavelength, such that as the pump wavelength is changed, the idler wavelength of the output light 350 is also changed. In some embodiments, a non-linear crystal 325 (such as, e.g., PPLN) is used to convert the pump-wavelength light (the photons having the shortest wavelength) into signal-wavelength light (photons having a wavelength between that of the pump and that of the idler wavelengths) and idler-wavelength light (photons having the longest wavelength). In some embodiments, the non-linear crystal 325 is heated and kept at a constant temperature in an oven. In some embodiments, the cavity is resonant at the idler wavelength and in this case the signal wavelength (i.e., a wavelength shorter than the idler wavelength) is the output light 350. In some embodiments, M2 mirror 326 is wavelength-selective such that it passes idler and perhaps some pump light. In some embodiments, wavelength-selective mirror 329 removes the pump light (directed downward) and passes idler light 350 as output to the right.

In some embodiments, the non-linear crystal 325 has periodically alternating ferroelectric domain structures that vary in period (the poling period) across the width of the crystal. In some embodiments, the sideways positioning of non-linear crystal 325 can be varied, in order to vary the poling period encountered by the light propagating through the crystal.

Figure 3B:
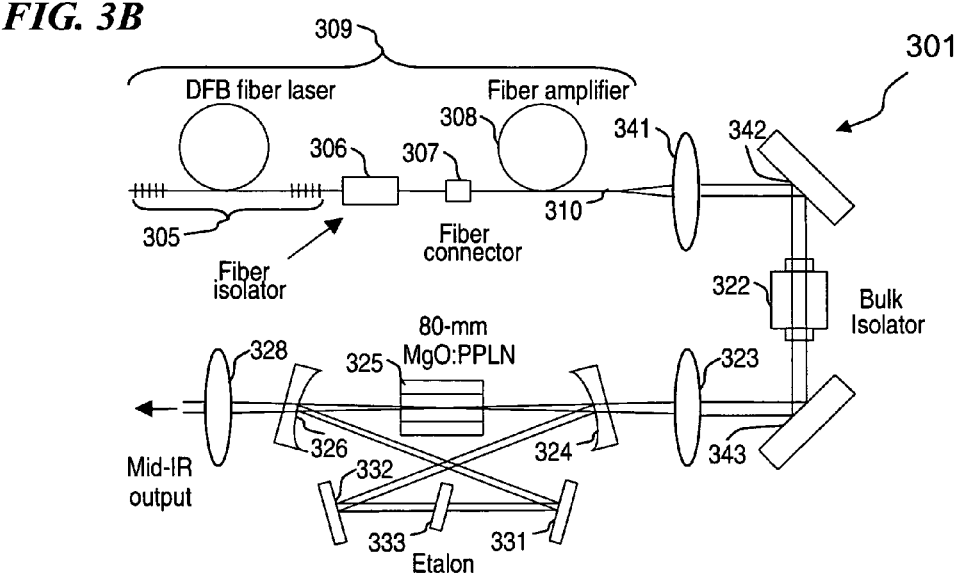
FIG. 3B is a block diagram of another four-mirror bow-tie OPO cavity design.

FIG. 3B is a block diagram of another four-mirror bow-tie OPO cavity design 301, having parts corresponding to those of FIG. 3A, and with the master-oscillator (the DFB fiber laser 305) power-amplifier (the fiber amplifier 308) shown. In some embodiments, diode-pumped fiber laser 309 is provided (e.g., a laser such as those described in commonly-assigned U.S. patent application Ser. No. 11/420,729 entitled "FIBER-OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD" by Fabio Di Teodoro filed 26 May, 2006, which is incorporated herein by reference), which includes a fiber isolator 306, fiber connector 307 (to fiber amplifier 308) and output fiber 310. In some embodiments, the output beam of laser 309 is collimated using lens 341, reflected by mirror 342, passed through one-way bulk isolator 322, and reflected by mirror 343 through focusing lens 323 that acts to focus (taking into account the focusing effects of mirror 324) the pump beam at the center of the PPLN 325. Output mirror 326 is transparent to the non-resonant wavelength (which is output through focusing lens 328, e.g., the idler wavelength) and the pump wavelength (in order to prevent a doubly or triply resonant cavity), while being highly reflective at the resonant (e.g., signal) wavelength. In some embodiments, the mirror 331 is highly reflective at the resonant (e.g., signal) wavelength, the etalon 333 is tuned to be transparent only at the resonant wavelength, and mirror 332 is highly reflective at the resonant (e.g., signal) wavelength. In some embodiments, as described further below, one or more of the mirrors 324, 326, 331, and/or 332 is partially transparent to the resonant wavelength (e.g., 1 to 5 percent transparent in total), in order to prevent excessive buildup of light at that wavelength in the cavity, which would tend to heat the crystal.

Figure 4:
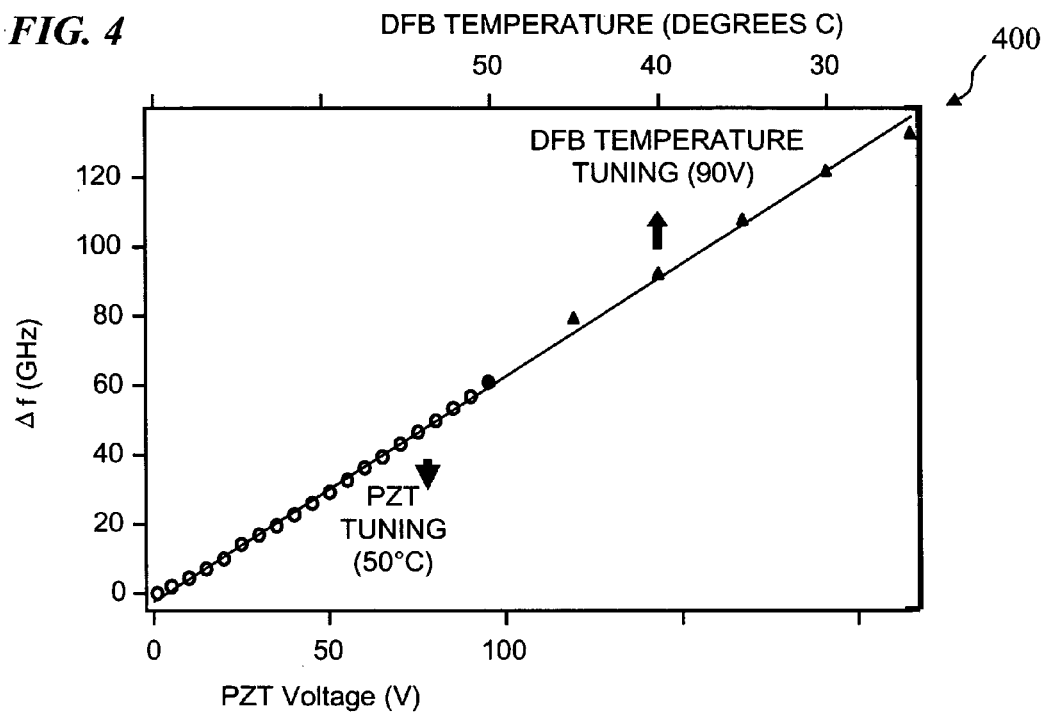
FIG. 4 is a graph 400 of continuous tuning of the OPO idler-frequency output light obtained by tuning the pump laser.

FIG. 4 is a graph of continuous tuning of the OPO idler-frequency output light obtained by tuning the pump laser. The change in frequency of the output light (250 in FIG. 2 or 350 in FIG. 3A) is changed from a base frequency of X+0 GHz with the fiber-laser tuning set at 50 degrees C. and zero volts on the PZT, through about X+60 GHz with the fiber-laser tuning set at 50 degrees C. and 90 volts on the PZT (the left half of the graph 400 maintains the DFB-tuning mechanism at 50 degrees C. while varying the PZT voltage), and is changed from about X+60 GHz with the fiber-laser tuning set at 50 degrees C. and 90 volts on the PZT through about X+130 GHz with the fiber-laser tuning set at 35 degrees C. and 90 volts on the PZT (the right half of the graph 400 maintains the DFB-tuning mechanism at 90 volts on the PZT while varying the temperature from 50 degrees C. downward to about 35 degrees C.).

Distributed-Feedback Fiber Laser

In some embodiments, the DFB fiber laser includes a length of optical fiber infused with dopant ions such as, for example, Ytterbium, Erbium and/or Thulium. The fiber is pumped by a semiconductor diode pump laser, the light from which may be pumped directly into the active core of the fiber or into a cladding surrounding the core or both. By optically exciting ions in the active core, optical amplification is enabled.

The gain fiber becomes a laser when suitable optical feedback is provided at wavelengths within the spectrum of the optical gain. In standard laser oscillators, feedback is provided using partially reflective mirrors to surround the medium providing optical gain. In a DFB fiber laser, the feedback is provided by a distributed-feedback structure within the fiber. The DFB structure is a pattern of modulated refractive index of the fiber, produced by exposing the fiber to beams of interfering ultraviolet light. The phase of the grating pattern written into the fiber may be shifted at its center by a quarter-wavelength ($\lambda/4$) to define the laser operating wavelength ($\lambda$). The grating produces stable laser operation on a single longitudinal mode.

By varying the fiber length (e.g., by straining the fiber) or refractive index (e.g., through temperature changes), the operating wavelength may be varied continuously, without mode-hops. In some embodiments, straining of the fiber may be accomplished by attaching (by gluing or other means) a piezoelectric transducer (PZT) to the fiber and applying an appropriate voltage to the transducer. Typical PZT elements can change length by a number of microns for voltages of 150V. Since typical DFB fiber oscillators have a length of only a few centimeters, this produces an appreciable tuning of the output wavelength of the laser. Tuning of the laser can be performed at a rate equivalent to the rate of modulation in length of the PZT. In some embodiments, an upper limit on the tuning rate of the laser is defined by mechanical resonances of the PZT, and is usually in the range 1 to 10 KHz. Using gain fiber that includes a structure such as a set of one or more stress rods, which induces birefringence, stable linearly polarized operation of the laser may be defined—in some embodiments, this is necessary for pumping of the OPO.

Output from a DFB fiber oscillator can be a few milliwatts, or can be over a Watt. Hence, it is possible to pump an OPO using solely the DFB fiber oscillator itself. Alternatively, the output from the fiber oscillator can be coupled into a fiber amplifier to reach the power level required. In some embodiments, a fiber amplifier includes a doped active fiber pumped by a semiconductor laser—very similar to that used in the laser oscillator. However, in the amplifier, there is no source of feedback—in fact, in some embodiments, the ends of the amplifier fiber are specifically treated to avoid feedback—typically by angle-cleaving or angle-polishing the fiber to avoid reflections back into the gain fiber. In polarization-maintaining fiber amplifiers, there is again a structure to induce birefringence in the fiber and produce linear polarization. The output from the fiber oscillator is coupled into the amplifier using appropriate fiber connectors, or by fusing the input and output fibers from the two devices. The gain fiber of the amplifier is chosen to support only the lowest-order transverse mode, which produces a Gaussian-profile diffraction-limited beam with a power level of multiple Watts.

Optical Parametric Oscillator

In some embodiments, a continuous-wave optical parametric oscillator suitable for pumping by a fiber laser includes an optical resonator containing a nonlinear crystal, lenses to match the pump laser's transverse mode to that of the optical resonator, and a Faraday isolator to prevent feedback to the pump laser. In some embodiments, the optical resonator includes two or more mirrors that provide a stable optical oscillator at one or more of the three interacting wavelengths (i.e., pump, signal, and/or idler) in the device. The OPO may be resonant at signal and/or idler wavelengths, and also may be resonant at pump wavelength. In the case of pump-wavelength-resonant devices, and also for devices where both signal and idler wavelengths are resonant, it is required to precisely control the cavity length to maintain resonance on these wavelengths. In such cases, the optical resonator may also incorporate a piezoelectric transducer element on one or more of the resonator mirrors, in order to move the mirror.

For a singly resonant OPO, precise cavity-length control is not required to attain stable oscillation. The device is free to oscillate on whichever longitudinal mode experiences maximum gain within the gain bandwidth defined by phase matching and by the losses within the cavity. Coarse tuning of a singly resonant OPO can be performed by varying the temperature of the nonlinear material or by varying the pump wavelength. Both methods will vary the wavelength of peak gain defined by the phase-matching condition. If the wavelength of peak gain changes by more than one free spectral range of the cavity, then a discrete discontinuous change in OPO signal wavelength may occur. Simultaneously, a discontinuous change in idler wavelength will occur. However, in some embodiments, these mode-hops are prevented by incorporating a wavelength-selective element such as a Fabry-Perot etalon within the OPO resonator. This element fixes the resonant signal wavelength, which experiences minimum loss in circulating within the cavity. Hence, despite the change in peak phase-matching gain, the OPO continues to oscillate on the same longitudinal mode at the signal wavelength. If the pump wavelength is altered while the oscillating signal wavelength is defined by the intra-cavity etalon, then tuning of the pump directly results in tuning of the idler wavelength. This is defined by the energy conservation relation $$\nu_p = \nu_s + \nu_i$$

where $\nu_p$, $\nu_s$, and $\nu_i$ are pump, signal and idler frequencies, respectively.

Since the signal frequency $\nu_s$ is fixed by the etalon, any change in the pump frequency $\Delta\nu_p$ results in a change in the idler frequency $\Delta\nu_i$, such that $$\Delta\nu_p = \Delta\nu_i$$

Hence, continuous tuning of the pump laser frequency can produce equivalent tuning in the OPO idler output. This provides a very simple way of tuning the OPO idler over a frequency range equivalent to the tuning range of the pump source.

One specific embodiment of the invention as a singly resonant CW OPO pumped by a DFB fiber laser has been implemented using 5% MgO-doped PPLN (magnesium-oxide-doped periodically-poled lithium niobate). The crystal used was of 80-mm length, allowing reduction of oscillation threshold as compared to devices using shorter crystal lengths. The device operated with a 0.9-Watt threshold.

As described above, in some embodiments, the pump source includes a distributed-feedback fiber laser and a fiber amplifier. The DFB fiber laser produces 10 milliwatts of single-frequency output in a linear polarization. The output wavelength of this fiber-based pump laser, centered on 1083 nm, can be tuned continuously a total of 0.5 nm (equivalent to 130 GHz) by temperature variation and/or piezoelectric strain of the DFB fiber. In some embodiments, the seed light is amplified using a polarization-maintaining amplifier, producing up to 10 Watts of single longitudinal and transverse mode, linearly polarized output.

In some embodiments, the pump beam passes through a Faraday isolator, and is mode-matched into a bow-tie ring cavity OPO using a single lens. In some embodiments, the cavity includes four mirrors, which are highly reflective at 1.8-μm signal wavelength, and highly transmissive at pump and idler wavelengths (1.08 μm and 2.7 μm, respectively). The cavity is designed to mode-match a cavity signal-beam waist to the pump beam, which is focused to a beam radius of 80 μm at the center of the crystal. The nonlinear crystal is of thickness 1 mm and width 7 mm. End faces are polished and antireflection coated at all three wavelengths. The crystals used were poled with a fan-out structure of varying poling period across its width, or multiple fixed-period gratings, with poling periods varying from 31.3 μm to 32.3 μm (31.3 to 32.3 micrometers). This allowed the wavelength to be tuned without varying the crystal temperature, by translating the crystal laterally. In order to fix the signal wavelength while pump-tuning the idler, an intra-cavity fused-silica etalon of free spectral range 400 GHz was used.

Figure 5:
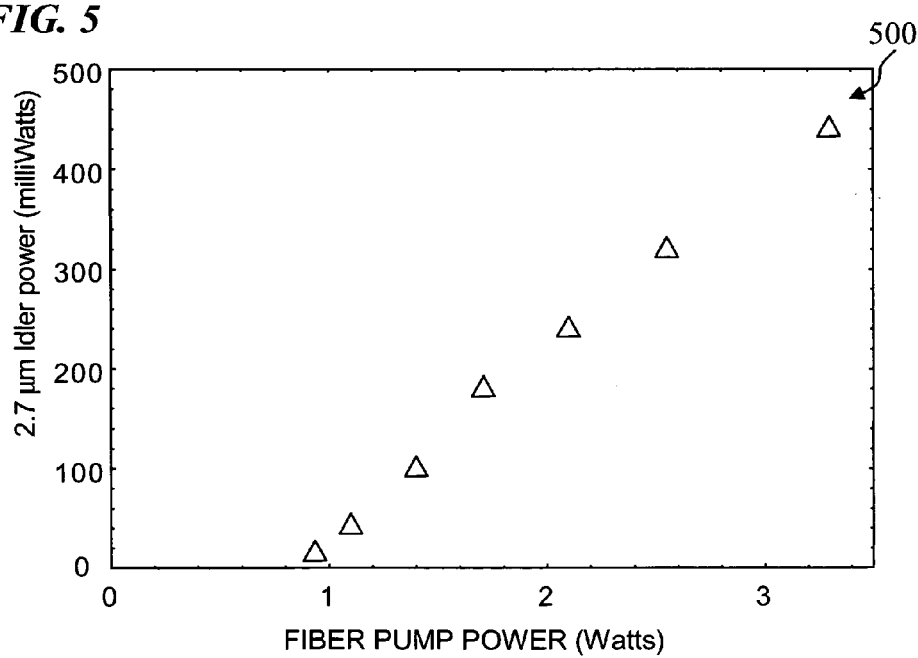
FIG. 5 is a graph 500 of the OPO idler output power versus pump-laser input power.

FIG. 5 is a graph 500 of continuous tuning of the OPO idler output power versus pump laser input power.

Figure 6:
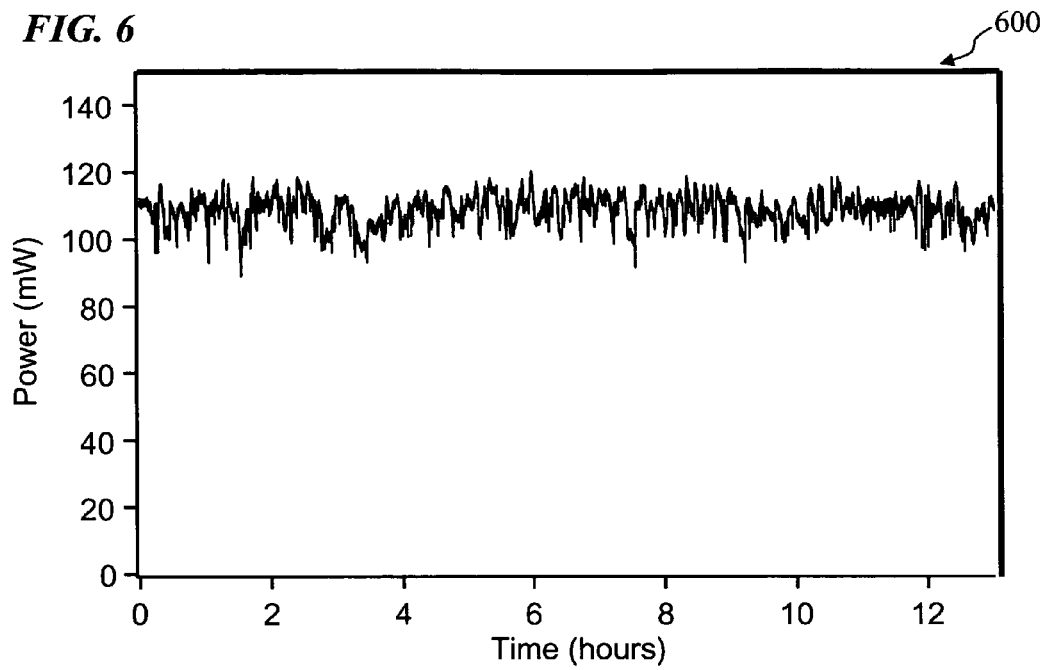
FIG. 6 is a graph 600 of the OPO idler output power over time.
Figure 7:
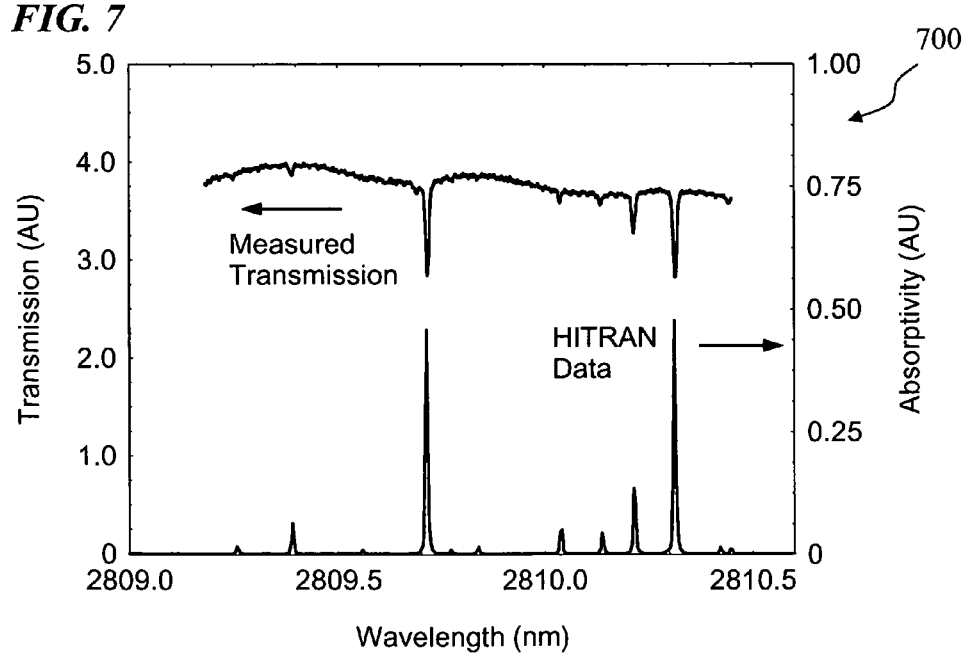
FIG. 7 is a graph 700 of the OPO idler output power transmission and absorptivity.

FIG. 6 is a graph 600 of continuous tuning of the OPO idler output power over time.

In one embodiment, the OPO oscillation threshold pump power was 0.9 Watts. An idler output of 440 milliwatts (FIG. 5) was measured at 2.7 μm (2.7 micrometers) for 3.3 Watts pump input. Using a similar OPO with a 50-mm MgO:PPLN crystal, as much as 2 Watts of idler power has been generated for an input of 5.7 Watts pump. The 80 mm OPO power output was measured over 12 hours (FIG. 6), with the MgO:PPLN crystal at room temperature. For a pump input of about 2 Watts, and 100-milliWatts idler output, output was stable within +/−10 milliwatts.

By translating the 80 mm fan-out PPLN crystal over a range of 5.6 mm, coarse idler-wavelength tuning was obtained from 3200 nm to 2800 nm. Tuning to 2650 nm was also performed by varying the temperature of the crystal, with a tuning rate of around −2.5 nm per degree C.

Using Fabry-Perot interferometers, the output spectrum of the OPO signal and idler wavelengths have been shown to be on a single longitudinal mode. Fine tuning of the idler wavelength is performed by tuning of the pump wavelength while the signal wavelength is fixed using an intracavity etalon. The DFB fiber laser was capable of 60 GHz continuous tuning by applying a 90-Volt potential to a PZT on the fiber, and a further 70 GHz by varying fiber temperature by 25 degrees C. 130 GHz of continuous idler tuning was performed by these two methods and is shown in FIG. 4.

Using this capability, carbon-dioxide absorption spectroscopy measurements have been demonstrated. The 2810-nm idler beam was passed through a 60-cm cell, filled to 25 torr pressure, and the transmitted intensity at the exit of the cell was measured using an Indium Arsenide photodetector. High-resolution absorption spectra were thus generated.

Some embodiments have shown stable room temperature operation of a CW PPLN OPO for the first time, with reduced threshold operation using an 80-mm length nonlinear crystal. In addition, 130-GHz continuous idler tuning and spectroscopic measurements of carbon dioxide absorption features have been demonstrated. Stable, continuous wave, room temperature operation of a singly resonant PPLN OPO has been demonstrated using a 5% MgO-doped PPLN. In some embodiments, the crystal used has 80 mm length, 60% longer than previously used in such CW devices, allowing reduction of oscillation threshold. It is believed the 0.9-Watt threshold is only 30% of that demonstrated in previous 1-micron pumped CW SROs.

Intra-Cavity Power Effects in Singly Resonant CW OPOs

In some embodiments, a continuous-wave singly resonant optical parametric oscillator (CW SRO) has been developed that can be pumped at a level of up to fifteen times its oscillation threshold by a single-frequency fiber-laser pump source. In some embodiments, extremely high intra-cavity circulating powers of over 1 kilowatt at the signal wavelength have been observed, along with associated effects including heating of the nonlinear crystal, and beam-quality degradation. Furthermore, these effects may be mitigated by implementing output coupling of light at the resonant wavelength, while also extracting multi-Watt single-frequency power output at both signal and idler wavelengths.

Single-frequency optical parametric oscillators (OPOs) have been shown to be important sources of high power, widely tunable, narrowband radiation in the near-infrared to mid-infrared region, with applications in spectroscopy and sensing. Although other configurations of OPO have been used, it is the singly resonant device (see, e.g., (1) W. R. Bosenberg, A. Drobshoff, J. I. Alexander, L. E. Myers, and R. L. Byer, "93% pump depletion, 3.5 W continuous-wave, singly resonant optical parametric oscillator", Opt. Lett. 21, 1336-1338 (1996); (2) M. E. Klein, C. K. Laue, D.-H. Lee, K-J. Boller and R. Wallenstein, "Diode-pumped singly resonant continuous-wave optical parametric oscillator with wide continuous tuning of the near-infrared idler wave", Opt. Lett. 25, 490-492 (2000); (3) I. Lindsay, B. Adhimoolam, P. Gross, M. Klein, and K.-J. Boller, "110 GHz rapid, continuous tuning from an optical parametric oscillator pumped by a fiber-amplified DBR diode laser", Optics Express 13, 1234-1239 (2005); and (4) A. Henderson and R. Stafford, "Low threshold, singly-resonant CW OPO pumped by an all-fiber pump source," Opt. Express 14, 767-772 (2006), www.opticsinfobase.org/abstract.cfm?URI=oe-14-2-767), with its simple tuning characteristics, which has proved to be most valuable for such applications. Single-frequency OPO idler power of up to 2.75 Watts has been generated ((5) S. T. Persijn, A. K. Y. Ngai, S. M. Cristescu and F. J. M. Harren, "Spectroscopic applications of a broadly tunable continuous wave optical parametric oscillator", postdeadline paper PDP-6, postdeadline proceedings of Laser Applications in Chemical, Security, and Environmental Analysis, OSA 2006.) with linewidths of a few MHz or below, while continuous tuning of the idler wavelength has been demonstrated without mode-hops over as much as 110 GHz ((3) I. Lindsay et al., "110 GHz rapid, continuous tuning from an optical parametric oscillator pumped by a fiber-amplified DBR diode laser," cited above). As such, CW SROs have already been shown to be versatile sources for mid-infrared laboratory spectroscopy. However, for some applications, further scaling of power, while retaining the excellent spectral and spatial output characteristics of these devices, is desirable. For example, in trace-gas detection based on photo-acoustic spectroscopy, the lower detection limit of the technique is inversely proportional to absorbed laser power. Hence higher single frequency power can enable increased detection sensitivity. In other spectroscopic detection techniques based on achieving a long absorption-path length in the gas sample being analyzed, high beam quality is also required to allow effective coupling to high-finesse cavities or multi-pass cells.

Pumping of CW SROs requires high power, narrowband laser sources with diffraction-limited beam quality. In order to produce single-longitudinal-mode (or single frequency) idler output it is necessary to use a single-frequency pump source. Standard diode-pumped crystal lasers of this type are able to provide powers of a few tens of Watts. However, with the advent of diode-pumped fiber lasers providing high beam quality, single-frequency output measured in hundreds of Watts ((6) Y. Jeong, J. Nilsson, J. K. Sahu, D. B. Soh, C. Alegria, P. Dupriez, C. A. Codemard, D. N. Payne, R. Horley, L. M. B. Hickey, L. Wanzcyk, J. Chryssou, J. A. Alvarez-Chavez, and P. W. Turner, "Single-frequency single-mode plane-polarized ytterbium-doped fiber master-oscillator power amplifier source with 264 W output power", Optics Letters, 30, 459-461 (2005).), the potential for scaling the power of single frequency mid-infrared OPOs to tens of Watts is clear. Broadband idler power output has already been demonstrated at a level of 10 Watts using a 50-Watt fiber pump source with a pump bandwidth of 1.8 nm ((7) D. -W. Chen and T. S. Rose, "Low noise 10-W cw OPO generation near 3 µm with MgO doped PPLN", postdeadline paper CThQ2 in Conference on Lasers and Electro-Optics 2005.). In that demonstration it was also observed that idler-beam quality degraded to a maximum M-squared parameter of 2.8 times diffraction limit at maximum power.

Some embodiments show the feasibility of scaling diffraction-limited, single frequency mid-infrared output beyond the current state of the art based on the use of single-frequency fiber lasers as pump sources. Some embodiments demonstrated a low-threshold SRO using magnesium-oxide-doped periodically-poled lithium niobate (MgO-PPLN) pumped by a 3-Watt fiber laser, it was observed that significant crystal heating (2 to 3 degrees C.) occurred under OPO oscillation when the crystal was not actively heated or temperature-controlled. In other embodiments, using a 15-Watt fiber pump source, temperature rises of as much as 30 degrees C. have been observed, leading to the inability to temperature-tune the OPO below this temperature without active cooling of the crystal. It is well known that operation of MgO-PPLN in the wavelength range where idler power is absorbed (>4 µm) causes thermal lensing and beam-quality degradation (see, e.g., (8) D. D. Lowenthal, "CW periodically poled LiNbO3 optical parametric oscillator model with strong idler absorption", IEEE J. Quantum Electron. 34, 1356 (1998)). However, since some embodiments of the OPOs described here operated in a spectral region where the idler is highly transmitted by lithium niobate, we have pursued the hypothesis that the heating is due to absorption of the signal wavelength, which reaches high intra-cavity power levels in high-finesse OPO cavities (e.g., where the four mirrors are highly reflective at the signal wavelength of about 1650 µm). In some embodiments, this phenomenon is minimized by outputting signal-wavelength power. Some embodiments show evidence for attributing the effect to absorption of the signal wavelength in the PPLN. Some embodiments benefit from the effects of reducing the intra-cavity circulating power in a singly resonant CW OPO, while maintaining the level of generated OPO idler power. The effects observed include a reduction in crystal heating by a factor of ten, improvement in the beam quality, and extraction of high powers at the signal wavelength. It is believed that the signal power extracted from the CW OPO is the highest yet extracted from such a device, and some embodiments show over 50% overall power-conversion efficiency from pump power into two single-frequency output beams.

In some embodiments, the pump laser was a Ytterbium-doped fiber laser source in a master-oscillator power-amplifier configuration that operated in a single transverse mode, in a linear polarization and with a single-frequency output spectrum (linewidth<100 kHz) at 1064 nm, defined by the master oscillator which was a distributed feedback (DFB) fiber laser. In reference (4) cited above, a crystal of MgO-PPLN of 80-mm length was used as the gain element in order to achieve low oscillation threshold. In this embodiment, the nonlinear crystal was of 50-mm length. As in the earlier device, the focusing of all three interacting waves in the OPO cavity matched a confocal parameter $\xi$ of 1. The output beam from the fiber pump laser was collimated to a $1/e^2$ beam diameter of 0.9 mm and then focused using a single lens to a $1/e^2$ diameter of 130 µm at the mid-point of the nonlinear crystal. The crystal was coated with tri-band anti-reflection coatings which had reflectivity R<0.1% at the signal wavelength, and R<1% at pump wavelength and idler wavelength. The MgO-PPLN crystals used were of two different designs. The first design included four discrete 1-mm-wide regions of poling period from 31.5 µm to 32.1 µm. The second design was a "fan-out" design with linearly varying poling period ranging from 30.8 to 31.65 µm over a crystal width of 5 mm. The optical cavity was a four-mirror bow-tie ring configuration, essentially identical to that used in the early work of Bosenberg et al. (see reference (1) cited above) and various others since. In the default cavity configuration, all cavity mirrors were highly reflecting (R~99.9%) at the signal wavelength (1.6 to 1.9 µm) and highly transmissive (>95%) at pump and idler wavelengths. It should be noted that in all but one of the demonstrations to date of singly resonant CW OPO oscillation, in order to minimize the OPO oscillation threshold, a cavity of maximum finesse has been used—i.e., mirrors of maximum available reflectivity (R~99.9%) have been used. Only in the case of reference (1), has output coupling for the signal wavelength been implemented. In that case, a single mirror transmitting 0.9% at the signal wavelength was used. In some embodiments of the present invention, a higher amount of output coupling of the signal wavelength is achieved by replacing one of the highly reflective cavity mirrors with a partially transmitting mirror (T up to 5%) at this wavelength.

Figure 8:
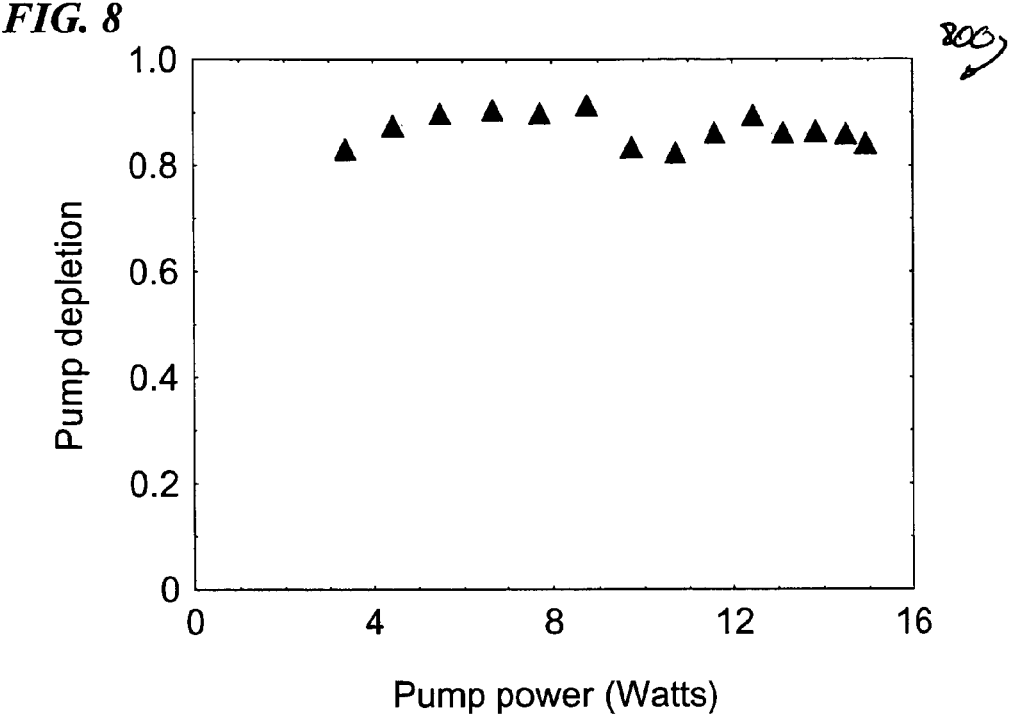
FIG. 8 is a graph 800 of OPO pump depletions.
Figure 9:
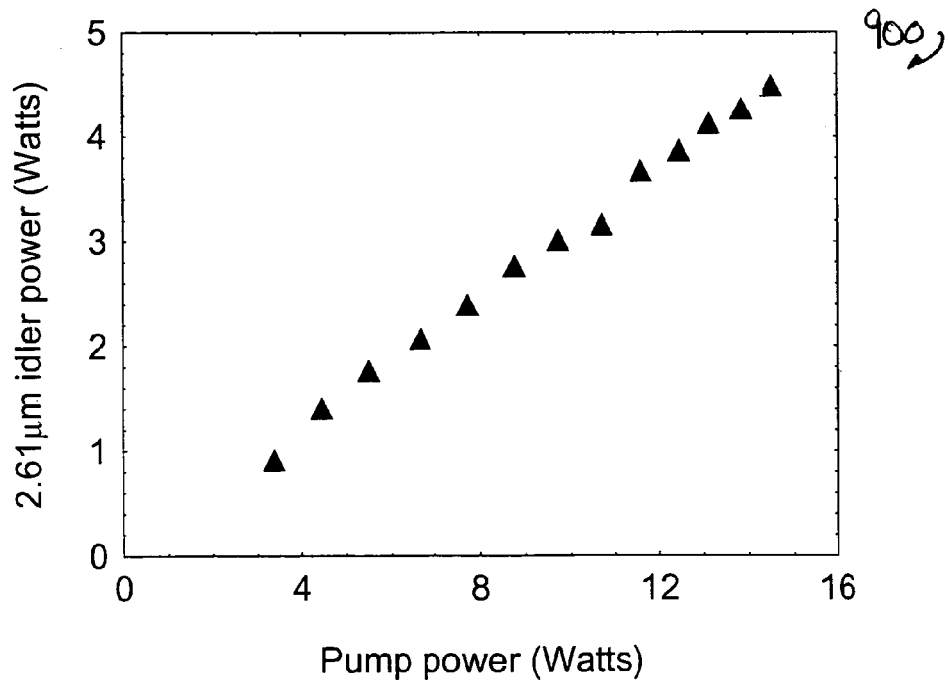
FIG. 9 is a graph 900 of measured idler power values versus pump power up to 15 Watts.

In some embodiments, a master-oscillator-power-amplifier (MOPA) diode-pumped fiber laser is used as a pump laser input to provide a pump beam quality that is very high (measured $M^2$~1.06) (e.g., a laser such as those described in U.S. patent application Ser. No. 11/420,729) entitled "FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD" by Fabio Di Teodoro filed 26 May, 2006, which is incorporated herein by reference). Due to the high pump-beam quality, the low round-trip loss in the optical cavity, and also due to very accurate mode matching of pump beam to OPO cavity, oscillation-threshold pump powers as low as 1.0 Watt have been demonstrated when the OPO was tuned to have a resonant signal wavelength of 1770 nm. This was demonstrated without significant output coupling at the signal wavelength, i.e., using cavity mirrors with maximum reflectivity R of about 99.9% at the signal wavelength. This one-Watt threshold value is at least 2 times lower than those previously demonstrated in similar CW OPO systems based on 50 mm PPLN crystal lengths. With 15 Watts pump power available, the inventor was thus able to pump the device at a level fifteen times its oscillation threshold. As a result, the progression of internal conversion efficiency (pump depletion) was determined as a function of the ratio of pump power to threshold power, to such high levels of pumping ratio (i.e. the ratio of pump power used to the threshold pump power needed to initiate OPO oscillation). Pump depletion was measured by observing the pump power transmitted through the OPO, separated from the other wavelengths by a dichroic filter, firstly with, and secondly without, blocking one leg of the optical cavity. With the discrete poling-period crystals, pump depletions were measured as high as high as 91% (FIG. 8), with peak efficiency reached at a pumping ratio around 2.5. This is in agreement with the theory for plane-wave devices (see, e.g., R. L. Byer: Treatise in Quantum Electronics, ed. By H. Rabin and C. L. Tang, Academic press 1975), p. 587.), but not with that for Gaussian-beam interaction, where maximum efficiency is expected at a pumping ratio of 6.5. However, the observation of depletion at higher pumping levels showed that conversion remains high up to the highest pump-power levels available, contrary to previously developed models (see, e.g., the R. L. Byer treatise cited above). Conversion efficiency measured in the different poling-period gratings dropped typically only by less than 10% from the peak value. Measured idler-power values at pump power up to 15 Watts are shown in FIG. 9. In this case, at maximum pump power, the signal wavelength was 1796 nm, 26 nm higher than the value at low power, due to a passive temperature increase of 23 degrees C. in the PPLN crystal. It can be seen that power up to 4.5 Watts was measured at the idler wavelength of 2610 nm, an external conversion 75% of the quantum limit. At this value of idler output power, the signal power leaking from each cavity mirror was 460 milliwatts.

It was observed that with the fan-out crystals the oscillation threshold was typically about 20% higher than under equivalent conditions compared to the discrete-poling-period crystals. It was also observed that maximum pump depletion for the fan-out crystals was about 80% as compared to 90% in the discrete-period crystals. These observations may be attributed to the finite phase-mismatch resulting from the variation in poling period across the width of the beam.

Figure 10:
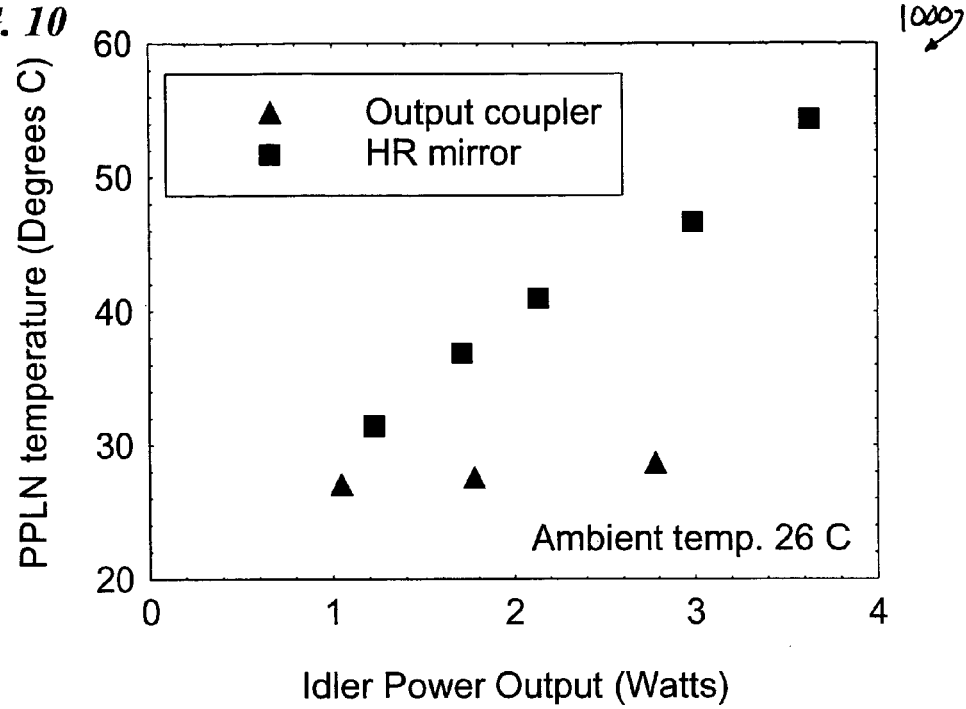
FIG. 10 is a graph 1000 of crystal heating as a function of generated idler power.

As mentioned above, significant heating of the MgO-PPLN crystal in the OPO was observed when the crystal was operated without temperature control. It was observed that at approximately the same maximum idler power output, the crystal reached different equilibrium temperatures varying from 33 degrees C. to 55 degrees C., depending upon the MgO-PPLN poling period and wavelength of operation (in an environment having about 25 degrees C. ambient temperature). Since PPLN is known to have minimal absorption at idler wavelengths in the 2.5-micron to 3.0-micron (2500-nm to 3000-nm) region where these experiments were conducted, the inventor believes that the crystal heating may result from low-level absorption (e.g., perhaps one percent or less) of the high intra-cavity circulating power (e.g., of about one kilowatt) at the signal wavelength. Estimation of cavity round-trip losses at the signal wavelength due to anti-reflection coating and mirror-coating loss (based on measurements supplied by coating vendors) indicated that the highest equilibrium temperatures were observed while operating in the MgO-PPLN gratings where the output wavelength corresponded to the lowest round-trip losses. As a result, the inventor endeavored to further reduce circulating power by replacing one of the flat OPO mirrors with a mirror that is partially transmitting (at a higher percent transmission than the HR mirrors) for light of the signal wavelength. As can be seen in FIG. 10, the crystal heating as a function of generated idler power was drastically lower when a 4.2% transmitting mirror was used as output coupler for the signal wavelength. Based on a comparison of measured transmitted signal power at maximum pump power from the output coupler mirror (4.3 W) and from one of the highly reflecting mirrors (25 mW of transmitted signal power) when used simultaneously as two mirrors of the same four-mirror cavity, and given the accurately known transmission value (4.2%) for the output coupler, the inventor was able to estimate a transmission value of 0.023% for the highly reflecting mirror at a signal wavelength of 1710 nm. Using this value, and based on the 320-mW signal power observed from each mirror when the cavity was operated only with highly reflecting mirrors, the inventor estimates that circulating power (primarily at the signal wavelength) could reach as high as 1.4 kilowatts at maximum pump power. At a lower power level, the inventor measured the electrical power required to produce a temperature rise in the PPLN crystal equivalent to that produced by self-heating (i.e., by the PPLN crystal absorbing a portion of the circulating power (primarily at the signal wavelength)). Based on this value (1.3 Watts) and the calculated circulating power (320 Watts), it was found that the crystal absorption in a 5-cm-long crystal was 0.4% (0.08%/cm). Based on this value, there could be as much as five (5) Watts absorbed signal power under conditions of maximum circulating power. With the output coupler (a mirror that transmits between one percent and ten percent of light at the resonant wavelength (e.g., the signal wavelength, in some embodiments)), the circulating signal power at maximum pump power was reduced by a factor of fourteen, to 100 Watts, and the corresponding crystal temperature was only 28.5 degrees C. as compared to 47 degrees C. at the same idler power value using the high-reflector cavity. Hence it is believed that the crystal-heating effect results from signal absorption has been demonstrated.

Figure 11:
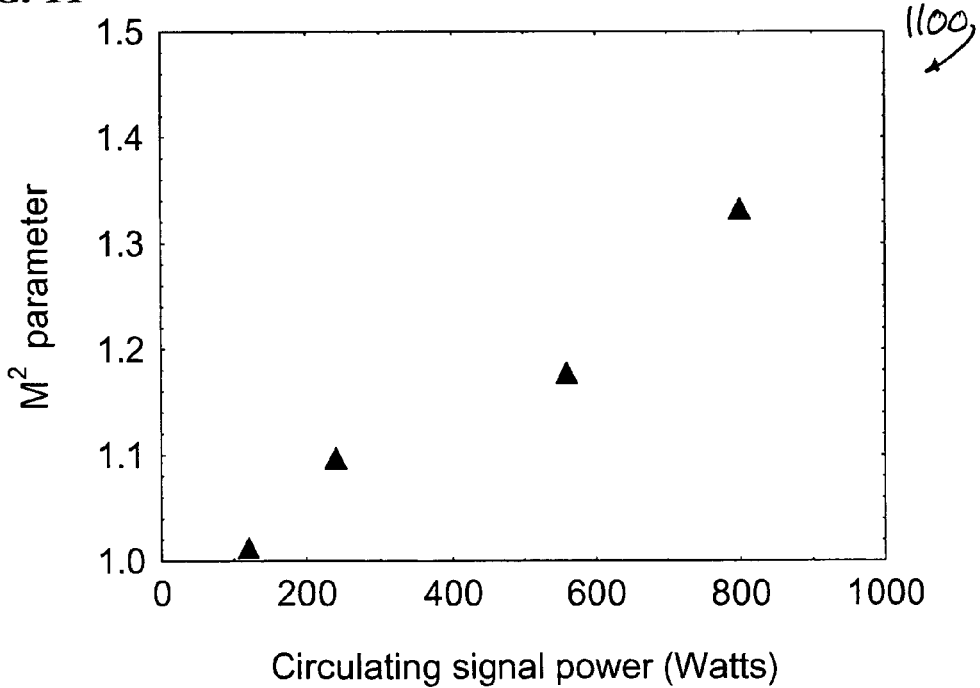
FIG. 11 is a graph 1100 of degradation of the idler output beam quality observed as circulating signal power increased in the OPO.
Figure 12:
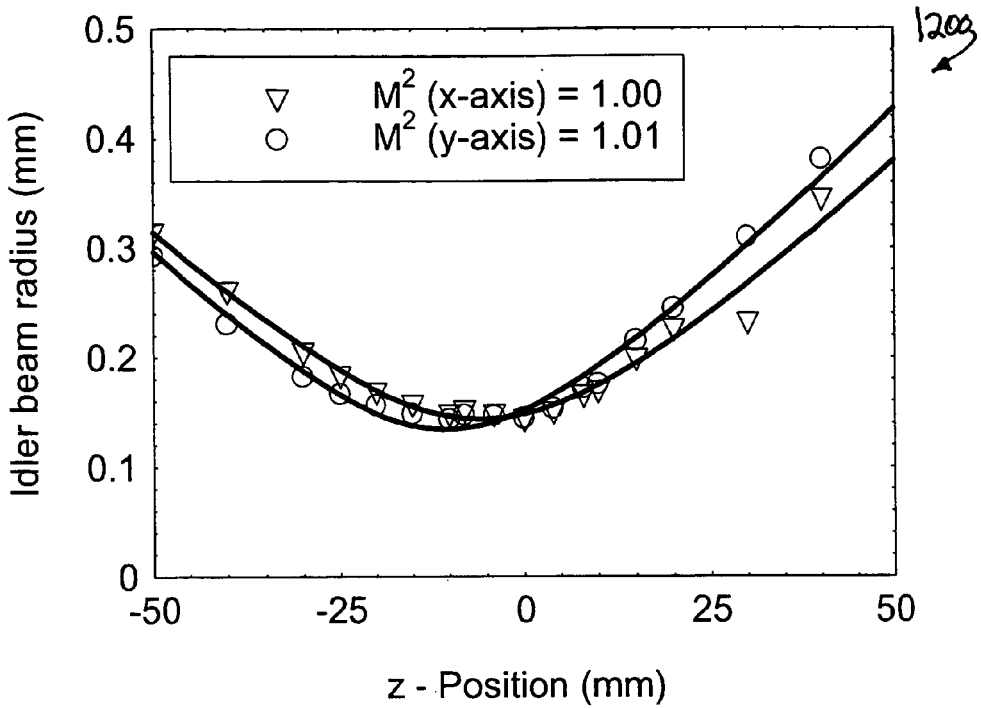
FIG. 12 is a graph 1200 of measured beam quality while operating the OPO with the 4.2% output coupler, such that intra-cavity power was at a level of 100 Watts, and found greatly improved idler beam quality at the same idler power level of 3.2 Watts, with a diffraction-limited beam quality of $M^2=1.0$ measured.

OPO beam quality was also measured as a function of the generated idler power. This was performed by measuring beam diameter as a function of z-position through a beam focus, using a scanning-knife-edge beam-profiler. It was observed that, consistent with the above-cited reference (7) by D. -W. Chen and T. S. Rose, significant degradation of the idler-beam quality was observed as circulating signal power increased (FIG. 11) when using an OPO cavity consisting only of high-reflecting mirrors. At maximum pump power, with an idler output power of 3.2 Watts, the M-squared parameter was found to have increased to a value of 1.35. The inventor then measured the beam quality while operating the OPO with the 4.2% output coupler, such that intra-cavity power was at a level of 100 Watts, and found greatly improved idler-beam quality at the same idler-power level of 3.2 Watts, with a diffraction-limited beam quality of $M^2=1.0$ measured (FIG. 12). Based on these observations, the inventor believes that the degradation of beam quality results from thermal effects including lensing in the MgO-PPLN crystal. Using optimized output coupling for each pump-power level, the inventor also believes that this indicates it will be possible to continue to scale OPO output power without further degradation of the output beam, by limiting the intra-cavity circulating power to the lowest value that allows efficient frequency conversion to be attained.

Figure 13:
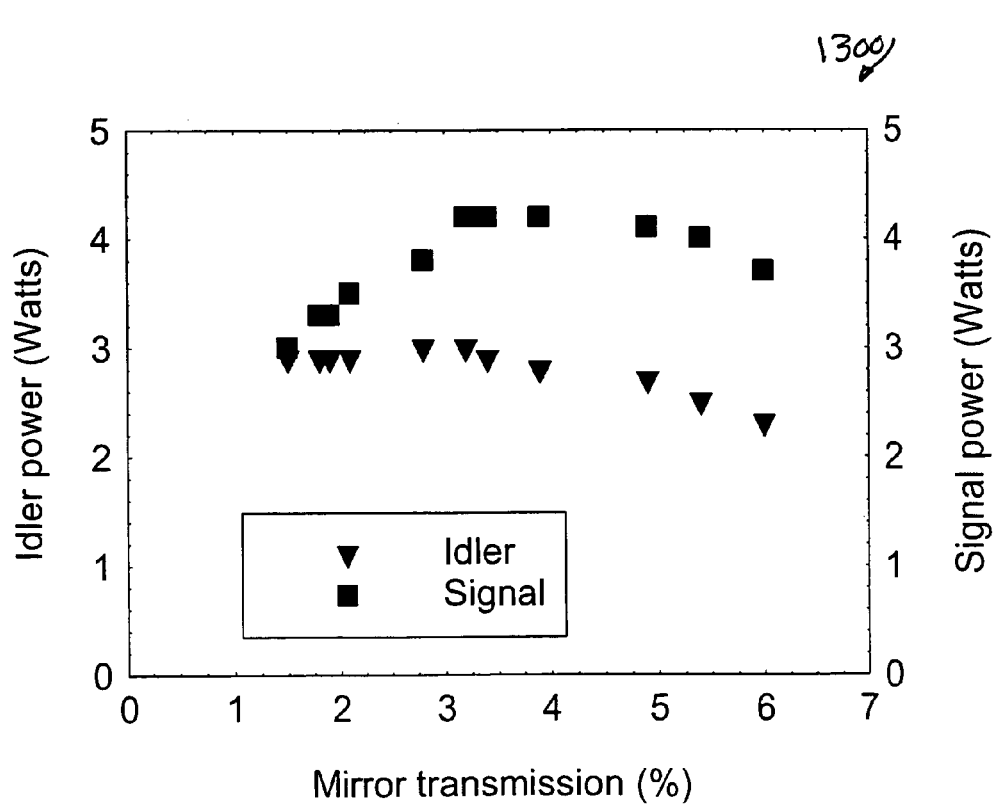
FIG. 13 is a graph 1300 of measurements of signal and idler power output as a function of output coupler transmission, from an OPO based on a fan-out PPLN crystal, which show that a maximum idler power of 3.0 Watts was observed at an output coupling value of 3.0%.

Some embodiments of the invention include selecting a value of output coupling for the signal wavelength that is optimal in terms of minimizing circulating power while maintaining a high level of overall conversion efficiency. In order to investigate optimization of the output coupling with respect to overall efficiency, some embodiments use an alternate highly reflecting mirror whose reflection band-edge (i.e., a wavelength at the edge of the band of wavelengths at which the mirror is highly reflecting) falls within the high-reflection range of the other mirrors used. Hence by temperature-tuning the operating wavelength of the OPO, these embodiments are able to vary the output coupling between 0 and 5% over a 20 nm wavelength range centered around 1670 nm. At this wavelength, the losses due to the anti-reflection coatings on the MgO-PPLN crystal were significantly higher than at 1710 nm, so it was expected that the optimum value of output coupling would be different to that at 1710 nm. Measurements of signal- and idler-power output as a function of output-coupler transmission, from an OPO based on a fan-out PPLN crystal, show that a maximum idler power of 3.0 Watts was observed at an output coupling value of 3.0%, as shown in FIG. 13. At this value the signal power was also near its maximum, at 4.2 Watts. Using this particular PPLN crystal, the maximum pump depletion was found to be 78% when pumped at 15 Watts. The oscillation threshold at this wavelength was found to be 5.8 Watts, confirming that the optimum pumping ratio is ~2.5.

In some embodiments, the invention has shown firstly that high efficiency may be sustained to very high pumping levels in singly resonant CW OPOs, contrary to previously developed models. Secondly, it was shown that heating effects and beam quality degradation observed in singly resonant CW OPOs using cavities with high finesse at the signal wavelength are due to absorption of signal power within the PPLN crystal. Finally, it was shown that high signal powers may be extracted from CW OPOs while retaining high overall conversion, by optimizing signal wavelength output coupling. The ability to extract high power single frequency output at both signal and idler expands the utility of OPOs as sources for spectroscopy and other applications.

Spectral Broadening and Stimulated-Raman Conversion

It has been confirmed for the first time that single frequency oscillation of a continuous wave singly resonant optical parametric oscillator is limited to operation below a critical value of pump power, as predicted by early theoretical treatments. Different regimes of spectral broadening are described as well as stimulated Raman conversion of the signal wave above this critical pump level. It is shown that spectral broadening may be eliminated by implementing output coupling of the signal wave, and demonstrated 8.6 Watts of total signal and idler output with single frequency spectrum at both wavelengths for 14.5 Watts pump power.

Continuous-wave optical-parametric oscillators (CW OPOs) are important sources of high power single frequency tunable radiation in the visible to mid-infrared region, with applications in spectroscopy and sensing. The singly resonant oscillator (SRO) has been proven to provide the most straightforward tuning characteristics of any type of CW OPO. In SROs developed to date, oscillation on a single frequency has been observed at the signal wavelength. However, all of the demonstrations in which spectral characteristics were measured, have been performed at relatively low ratios of pump power to oscillation threshold pump power (known as pumping ratio), with maximum values less than four (Table 1 refers to the following 6 papers) (see 1. S. T. Yang, R. C. Eckardt and R. L. Byer, "Continuous-wave singly resonant optical parametric oscillator pumped by a single-frequency resonantly doubled Nd:YAG laser", Opt. Lett. 18, 971 (1993); 2. W. R. Bosenberg, A. Drobshoff, J. I. Alexander, L. E. Myers, and R. L. Byer, "93% pump depletion, 3.5 W continuous-wave, singly resonant optical parametric oscillator", Opt. Lett. 21, 1336 (1996); 3. M. E. Klein, C. K. Laue, D.-H. Lee, K-J. Boller and R. Wallenstein, "Diode-pumped singly resonant continuous-wave optical parametric oscillator with wide continuous tuning of the near-infrared idler wave", Opt. Lett. 25, 490 (2000); 4. P. Gross, M. E. Klein, T. Walde, K.-J. Boller, M. Auerbach, P. Wessels, and C. Fallnich, "Fiber-laser-pumped continuous-wave singly resonant optical parametric oscillator," Opt. Lett. 27, 418 (2002); 5. M. M. J. W. van Herpen, S. Li, S. E. Bisson, S. Te Lintel Hekkert and F. J. M. Harren, "Tuning and stability of a continuous-wave mid-infrared high-power single resonant optical parametric oscillator", Appl. Phys. B, 75, 329 (2002); and 6. A. Henderson and R. Stafford, "Low threshold, singly-resonant CW OPO pumped by an all-fiber pump source," Opt. Express 14, 767 (2006)). However, with recent improvements in nonlinear materials it has been shown that oscillation thresholds can be significantly reduced. At the same time, the power available from diffraction-limited laser sources, in particular diode-pumped fiber lasers, has greatly increased. Hence it is now possible to reach much higher pumping ratios in CW singly resonant OPOs. It was predicted by Kreuzer (see L. B. Kreuzer, "Single and multimode oscillation of the singly resonant optical parametric oscillator", in Proceedings of the joint conference on lasers and Opto-electronics (Institution of Electronic and Radio Engineers, London, 1969), pp. 52-63) in 1969 that single frequency oscillation would occur at moderate pumping ratios, but that multimode oscillation would occur above a pump power Pc corresponding to critical value of pumping ratio.

TABLE 1

Details of previous ring cavity SRO demonstrations.

| Reference | Threshold power | Max. Pump ratio | Material, pump wavelength | Signal bandwidth |
|---|---|---|---|---|
| [1.] | 4.3 Watts | 1.56 | KTP, 532 nm | SLM |
| [2.] | 3.6 Watts | 3.75 | PPLN, 1064 nm | SLM |
| [3.] | 1.6 Watts | 1.41 | PPLN, 924 nm | SLM |
| [4.] | 3.0 Watts | 3.57 | PPLN, 1064 nm | SLM |
| [5.] | 3.5 Watts | 2.42 | PPLN, 1064 nm | SLM |
| [6.] | 0.9 Watts | 3.00 | MgO:PPLN, 1083 nm | SLM |
| This work | 1.5 Watts | 9.67 | MgO:PPLN, 1064 nm | ~2 nm |

Some embodiments of the present invention provide, for the first time, observation of the predicted multimode oscillation of the resonant signal wave above such a critical pumping ratio and describe the different spectral characteristics observed at increasing pump levels. At high pumping levels, it was also observed stimulated Raman conversion (SRS) of the signal wave to Stokes and anti-Stokes bands. Although observations of SRS have been made in periodically-poled materials using pulsed sources (see e.g., 8. G. McConnell and A. Ferguson, "Simultaneous stimulated Raman scattering and second harmonic generation in periodically poled lithium niobate," Opt. Express 13, 2099 (2005) www.opticsinfobase.org/abstract.cfm?URI=oe-13-6-2099; 9. V. Pasiskevicius, A. Fragemann, F. Laurell, R. Butkus, V. Smilgevicius and A. Piskarskas, "Enhanced stimulated Raman scattering in optical parametric oscillators from periodically poled KTiOPO4," App. Phys. Lett. 82, 325 (2003).), it is believed this is the first observation of SRS in a CW OPO.

The OPO used in this work has been described in ref. 10. The pump laser was an Ytterbium-doped fiber laser source, operating in a single transverse mode, with a single frequency output spectrum (linewidth<100 kHz) at 1064 nm. The Magnesium Oxide doped periodically-poled Lithium Niobate (MgO:PPLN) nonlinear crystal used was of 50 mm length. Focusing of all three interacting waves in the OPO cavity matched a confocal parameter ξ of 1. The output beam from the fiber pump laser was focused using a single lens to a 1/e2 diameter of 130 μm at the mid-point of the nonlinear crystal. The crystal was coated with tri-band anti-reflection coatings which had reflectivity R<0.1% at the signal, and R<1% at pump and idler. The nonlinear crystals used a "fan-out" design with linearly varying poling period ranging from 30.8 to 31.65 microns over a crystal width of 5 mm. The optical cavity was a four-mirror bow-tie ring configuration, essentially identical to that used in the early work of Bosenberg et al. (see the W. R. Bosenberg et al. reference 2 of Table 1) and various others since. In the default cavity configuration, all cavity mirrors were highly reflecting (R~99.9%) at the signal wavelength (1.6 to 1.9 microns) and highly transmissive (>95%) at pump and idler wavelengths. In some experiments, output coupling of the signal wavelength was also investigated by replacing one of the high reflectors with an output coupler.

Figure 14:
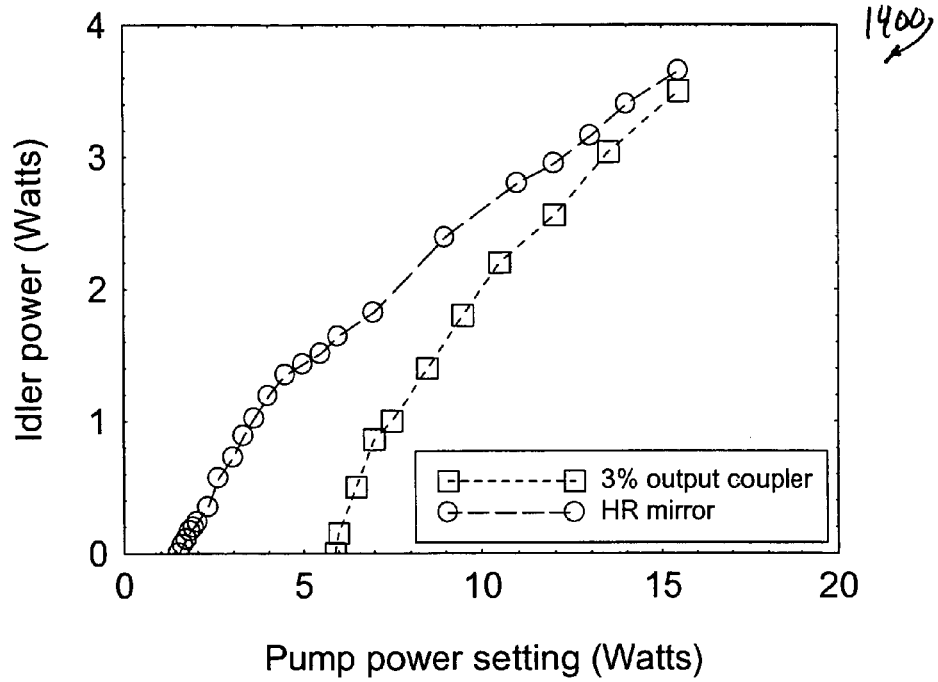
FIG. 14 is a graph 1400 of the OPO output power as a function of pump input power at two different levels of signal extraction.
Figure 15:
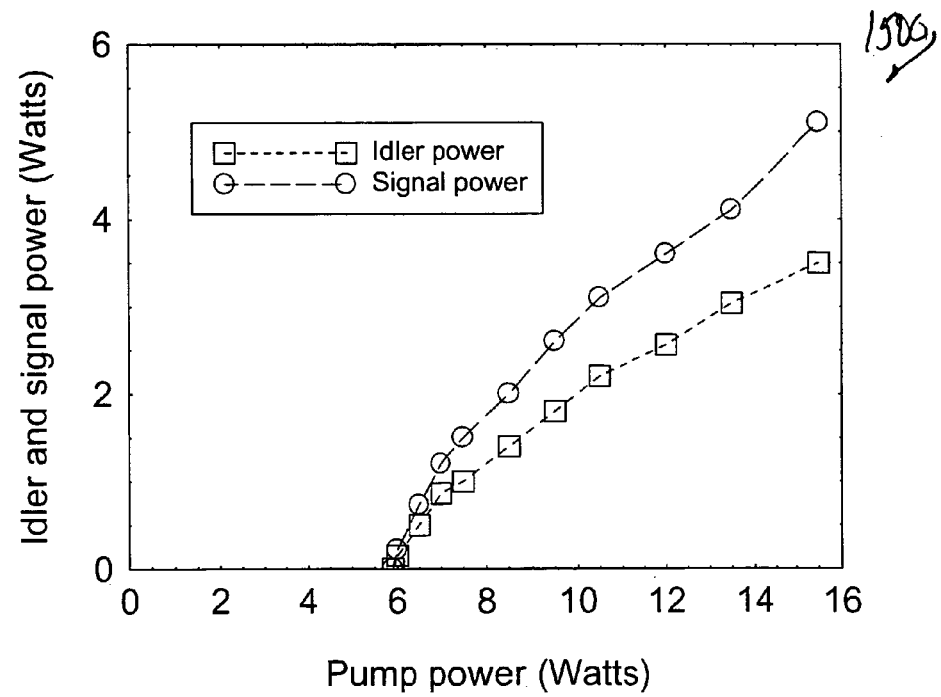
FIG. 15 is a graph 1500 of the signal and idler output power as a function of pump power measured in cavity with 3% transmitting mirror.

Using an optical cavity consisting of four highly reflective mirrors for the signal wavelength, the oscillation threshold of the OPO at ~1650 nm was 1.5 Watts. It was observed that the conversion efficiency of the OPO reaches a maximum at a pumping ratio of around 2.5. This is consistent with data measured in the W. R. Bosenberg et al. reference 2 of Table 1, but conflicts with the analysis in R. L. Byer, in Treatise in Quantum Electronics, H. Rabin and C. L. Tang eds. (Academic press, New York 1975), pp. 587-702, which predicts maximum conversion at a pumping ratio of ~6.5 for focused Gaussian beams. The behavior much more closely matches the behavior predicted for plane waves. Using the fan-out crystals described here, we observed maximum pump depletion of ~75%. Idler output of 3.5 Watts was obtained at the maximum pump input of 14.5 Watts. With the highly reflecting signal mirrors, the output at the signal wavelength is very low—only 210 mW from each mirror at maximum pump power. As a result the intracavity circulating power is very high—up to 0.9 kilowatts. As discussed herein, this leads to very significant crystal heating and measurable degradation in OPO beam quality. In order to reduce these effects, output coupling of the signal wave was implemented, with the intention of deliberately increasing the oscillation threshold to a value 2.5 times lower than the maximum pump power available. Based on an estimated round trip loss of 0.7% in the high-reflector cavity at the signal wavelength selected an output coupler with a transmission of 3.0% to achieve this. Replacing one of the plane high reflectors with such an output coupler, we measured an oscillation threshold increased to 5.8 Watts (FIG. 14). Pumping with the full 14.5 Watts available, we were able to measure virtually the same idler output power of 3.5 Watts. However, the signal power from the output coupler was measured to increase to 5.1 Watts (FIG. 15). As a result, a total output 8.6 Watts of signal+idler was obtained for an input of 14.5 Watts, a conversion efficiency of 60%.

Figure 16:
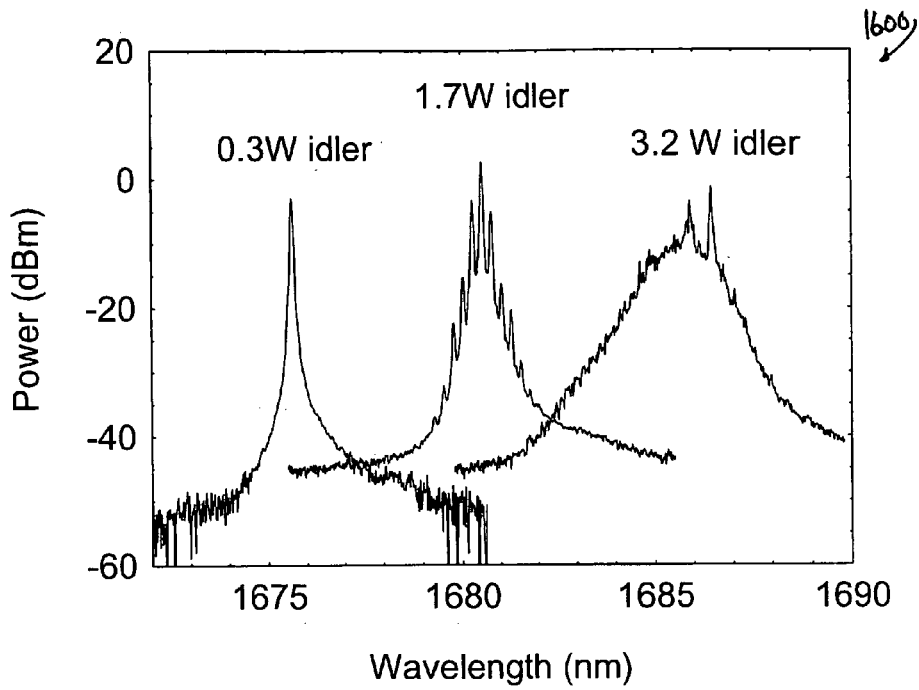
FIG. 16 is a graph 1600 of spectrums of signal wavelength, in OPO cavity consisting only of HR mirrors, at pumping ratios of 1.3, 4 and 9.

Measurements of OPO signal spectrum were performed using an optical spectrum analyzer. Since we used a single frequency pump source, it is expected that the idler spectrum will also be a single frequency (previous direct measurements have shown an idler linewidth less than 1 MHz at pumping ratios up to three). The spectrum was first measured for the case of an OPO cavity using only highly reflecting mirrors for the signal. It was observed that at low pump powers, the spectrum was as previously observed: single frequency. However as pumping ratio increased, the spectrum broadened, with two distinct regimes of broadened-linewidth operation observed (FIG. 16). It was observed that up to a pumping ratio of 3, the spectrum was a single frequency. At pumping ratios between 3 and 4.7, the spectrum showed a symmetric pattern of side modes, with a characteristic spacing of 0.25 nm. The number and intensity of the side-modes increased with increasing pump power. Above a pumping ratio of 4.7, the spectrum became continuous and broadband with a full-width half maximum of around 2 nm. This pattern of behavior is qualitatively as predicted by L. B. Kreuzer, "Single and multimode oscillation of the singly resonant optical parametric oscillator", in Proceedings of the joint conference on lasers and Opto-electronics (Institution of Electronic and Radio Engineers, London, 1969), pp. 52-63, which calculated that multimode oscillation would begin at a pumping ratio of 4.6. That analysis was based upon infinite plane waves, and so is not directly applicable here. However, as predicted in that work, the maximum conversion is observed at a pumping ratio of ~2.5, while the critical value Pc at which multimode oscillation begins is at a higher pumping ratio. Hence it is possible to achieve full conversion of pump light while retaining a single frequency spectrum at the signal wave up to the critical pump power Pc.

Figure 17:
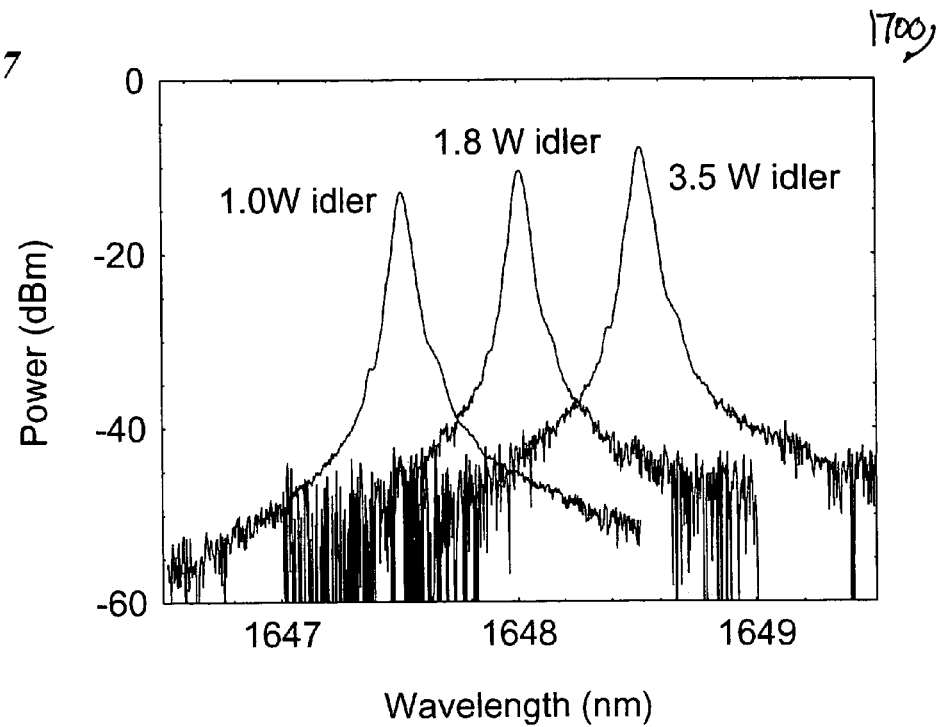
FIG. 17 is a graph 1700 of spectrums of signal wavelength in OPO cavity using a 3% transmitting mirror, at pumping ratios of 1.3, 1.6 and 2.5.

If, however, single frequency operation is to be maintained at higher pumping levels, it is necessary to keep the pumping ratio below the critical value. In order to achieve this, the oscillation threshold must be increased. Since oscillation threshold is directly proportional to cavity losses at the resonant signal wavelength, the OPO threshold can be optimized by increasing output coupling via a partially transmitting mirror at the signal wavelength. As described above, an optimal value of output coupling was used, and the conversion efficiency was maintained, while realizing an optimal pumping ratio of ~2.5. Under these conditions, it was observed that the signal spectrum remains single frequency at all pump power levels (FIG. 17).

Figure 18A:
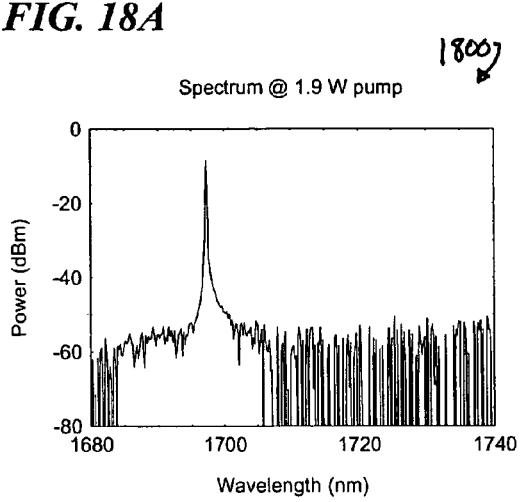
FIGS. 18A, 18B, and 18C are graphs 1800, 1801, and 1802, respectively of wider views of spectrums in vicinity of signal wavelength, in OPO cavity using HR mirrors, at pumping ratios of 1.3, 2 and 8.
Figure 18B:
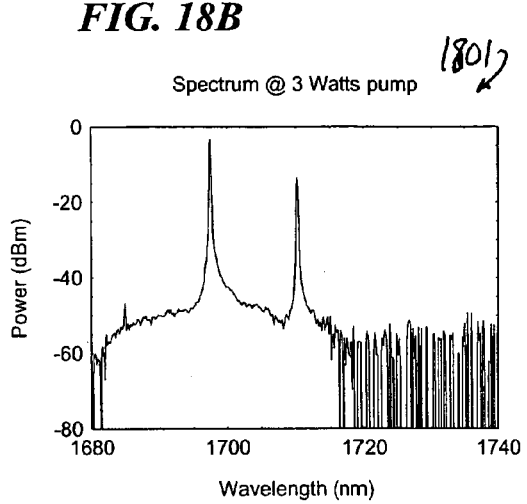
Figure 18C:
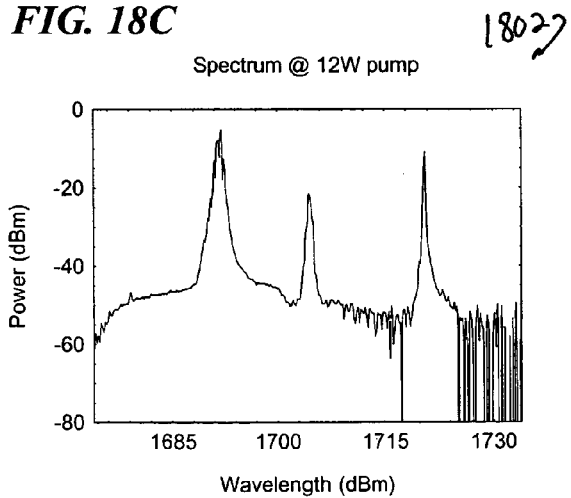
Figure 19:
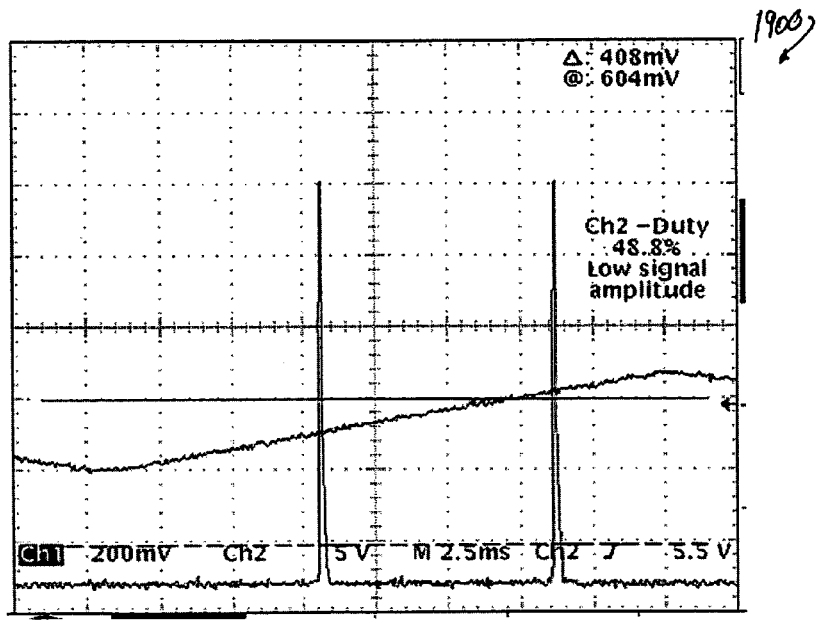
FIG. 19 is a graph 1900 of interferometer measurement of OPO signal spectrum made at maximum OPO output power.

With the high-reflector cavity, when the output spectrum was examined over a wider range centered on the signal wavelength, it was found that there was not only spectral broadening of the central signal wavelength feature, but also satellite peaks in the spectrum. As can be seen in FIGS. 18A-18C, one peak is observed red-shifted from the signal frequency by 44 cm-1. Simultaneously, a much weaker peak blue-shifted by the same amount is observed. At higher pumping levels, a further peak is observed, red-shifted by 98 cm-1. It is believed that these spectral features result from stimulated raman conversion of the signal frequency. It has been observed that the raman shifts in periodically-poled lithium niobate are completely different to those in single domain lithium niobate, and that they vary with the poling period of the PPLN. The first two raman peaks observed in J. Shikata, M. Nakazawa, T. Matsumoto, Y. Sasaki, T. Sato and H. Ito, "CARS spectroscopy of THz-frequency optical phonons in single-domain and periodically poled LiNbO3 crystals", Annual report, 2002, Ito Laboratory Research Institute of Electrical Communication Tohoku University, in 31 micron-period PPLN were observed to be at frequency shifts of 46 cm-1 and 107 cm-1. These values are closed to the values observed here. The discrepancy may be due to the use here of MgO:PPLN. In the high reflector cavity, Raman conversion is observed to occur at pumping ratios of 2 and above, with intracavity circulating powers above 230 Watts. With an output coupler, however, no Raman conversion is observed up to a pumping ratio of 2.5, and up to an intra-cavity power of 170 Watts.

In conclusion, it has been shown for the first time that single frequency oscillation of a singly resonant OPO can be maintained only up to a critical value of pumping ratio. At pumping ratios greater than three, multimode oscillation occurs, and even raman conversion of the signal. In order to operate at maximum efficiency, while maintaining a single frequency spectrum, the pumping ratio should be held at a value of 2.5.

High Power, Single Frequency CW OPO with High Long-Term Power Stability

Some embodiment provide single frequency CW OPO output of 8.6 Watts in two wavelengths. It is believed that the 5.1 Watt signal wavelength output to be the highest yet reported. Power stability was 3% over 24 hours.

Power scaling of single frequency continuous wave optical parametric oscillators (CW OPOs) is of great interest for spectroscopic techniques such as photo-acoustic sensing, where detection sensitivity scales with power. High power mid-infrared output is also of great interest in applications such as infrared countermeasures. The advent of CW fiber lasers with near-infrared power outputs up to kilowatt level in diffraction-limited beams has enabled the possibility to scale CW OPOs into the tens to hundreds of Watts. In this work, we report demonstration of multi-Watt power output in both signal and idler wavelengths from a CW OPO, with diffraction-limited beam quality and single frequency spectrum at both wavelengths. It also has been demonstrated very high levels of power and wavelength stability at maximum power levels.

FIG. 15 shows signal and idler output power as a function of pump power measured in cavity with 3% transmitting mirror.

The CW OPO used a 50 mm length Magnesium-Oxide doped periodically-poled lithium niobate (MgO:PPLN) crystal of poling period between 30.8 μm and 31.7 μm, and was pumped by a single frequency fiber laser with output of 15 Watts at 1064 nm. The OPO configuration was a standard bow-tie ring cavity resonant at the signal wavelength and centered on 1650 nm. The cavity was designed to allow confocal focusing of all the interacting wavelengths. The cavity mirrors were highly reflective at the signal wavelength and highly transmissive at pump and idler. One of these mirrors could be replaced by a partially transmissive output coupler mirror for the signal wavelength.

With a cavity consisting of all highly reflecting mirrors, the oscillation threshold was observed to be ~1.5 Watts. In this cavity configuration, at full pump power, output power of 3.5 Watts of idler frequency output at 3 microns could be obtained. However the output coupled signal power was only 200 milliwatts from each mirror. As a result much of the power generated at the signal wavelength was dissipated as heat in the PPLN crystal. Crystal temperature rises of up to thirty degrees Kelvin have been observed. This resulted in significant degradation of the beam quality from the OPO. Another result of operation of the OPO without any output coupling was the generation of extremely high circulating power (up to 1.4 kilowatts) at the signal wavelength. Under these conditions significant broadening of the signal wavelength spectrum was observed, and even raman shifting of the signal. These effects are described in more detail in ref. 1 and ref. 2. In order to mitigate these effects, output coupling of the signal wavelength was implemented. Using a 3% output coupler, the oscillation threshold was deliberately increased to 6 Watts. With 15 Watts pump power available, efficient oscillation was still attained (pump depletions up to 80%) and 5.1 Watts of signal extracted in a single beam. Simultaneous idler output of 3.5 Watts was also measured (FIG. 15).

The beam quality of the signal beam was found to have improved to a value of M2~1.0, and the signal spectrum was confirmed to be single frequency using a fabry-perot interferometer (FIG. 2). Since the pump wave also is a single longitudinal mode, energy conservation constrains the idler spectrum to be similar.

Figure 20:
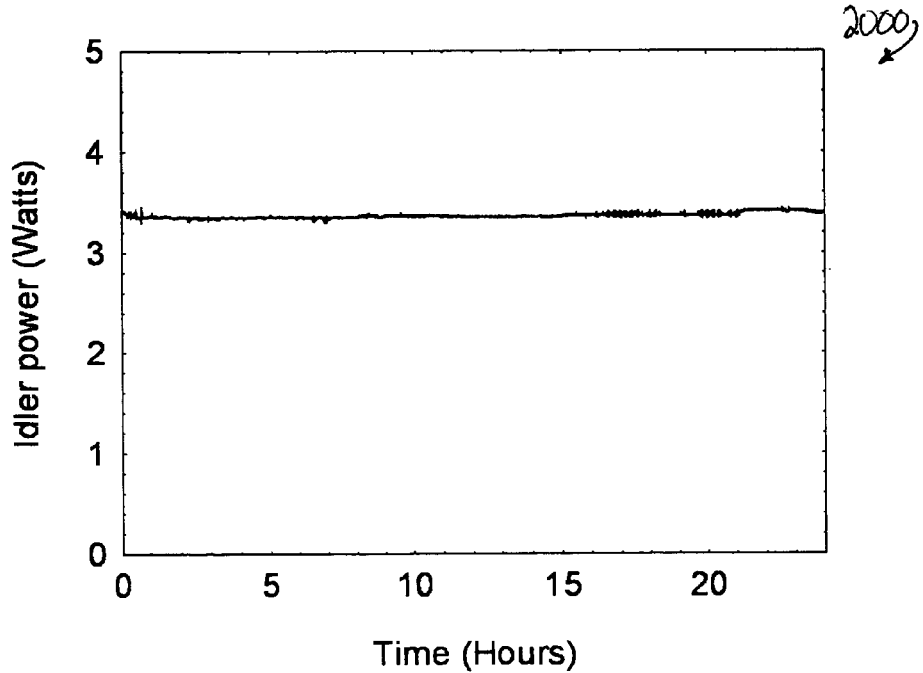
FIG. 20 is a graph 2000 of OPO idler power stability at a wavelength of 3010 nm over a 24-hour period.
Figure 21:
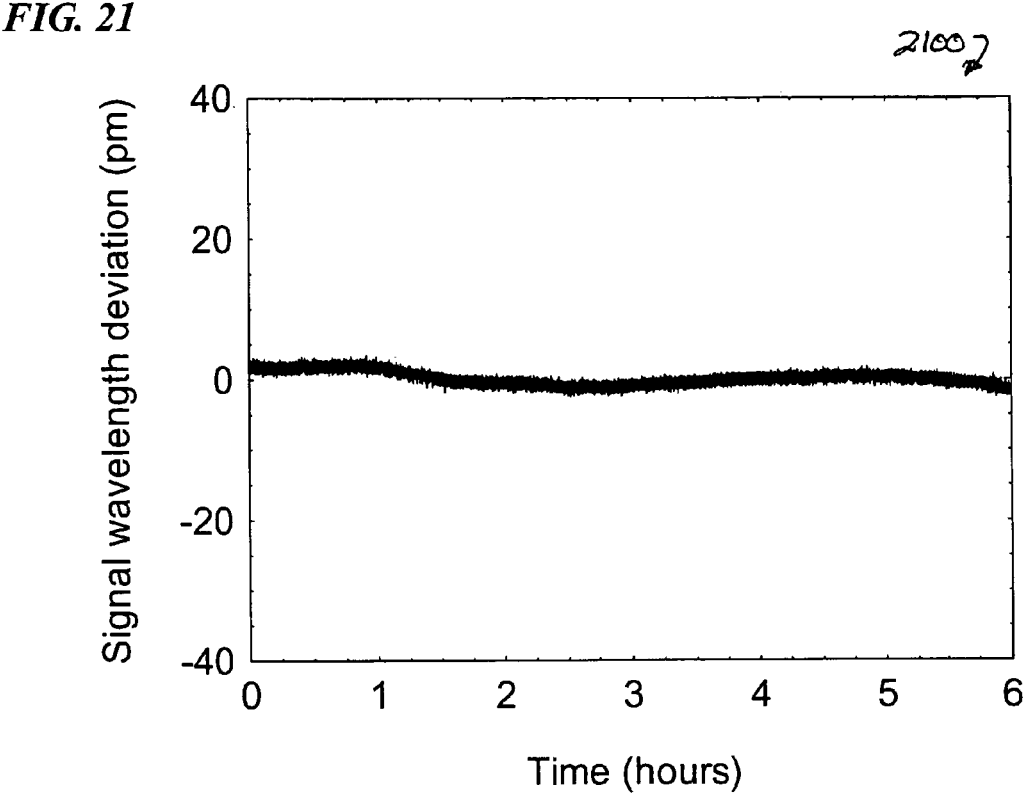
FIG. 21 is a graph 2100 of OPO signal wavelength stability over a six-hour period. No mode-hops are observed during this period.

Using the output coupler-cavity, we have performed long-term stability tests on the OPO. In this case a fabry perot etalon was used as an intracavity element to stabilize the signal frequency. Over a period of twenty-four hours an idler power stability of 3% peak-to-peak was measured (FIG. 20). During the same test run, we observed a period of as long as six hours without a longitudinal mode hop in the signal wavelength (FIG. 21). During this measurement, with the intracavity etalon, the signal power was ~4.4 Watts.

In summary, it has been demonstrated for the first time, simultaneous multi-Watt single frequency output at two wavelengths from a CW OPO. The system has been shown to display a high level of power and wavelength stability.

Figure 22:
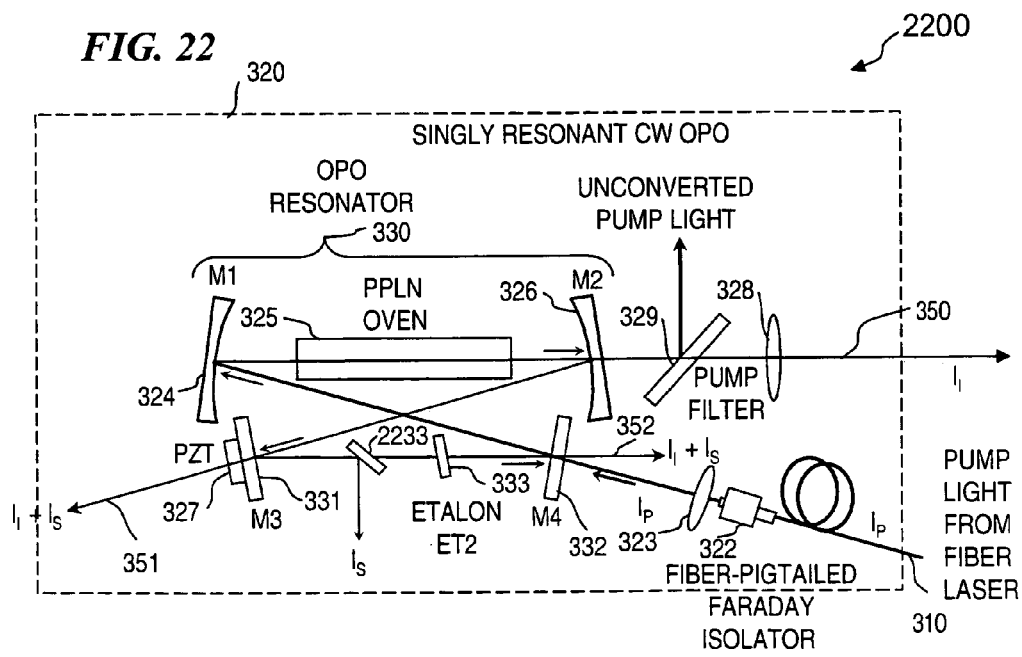
FIG. 22 is a block diagram of another four-mirror bow-tie OPO cavity design 2200.

FIG. 22 is a block diagram of another four-mirror bow-tie OPO cavity design 2200. This design is substantially the same as FIG. 3, except that the pump power is introduced through mirror 332 rather than through mirror 324. In some embodiments, an output coupler (e.g., a dichroic mirror) 2233 is used to remove some of the resonant wavelength.

Figure 23:
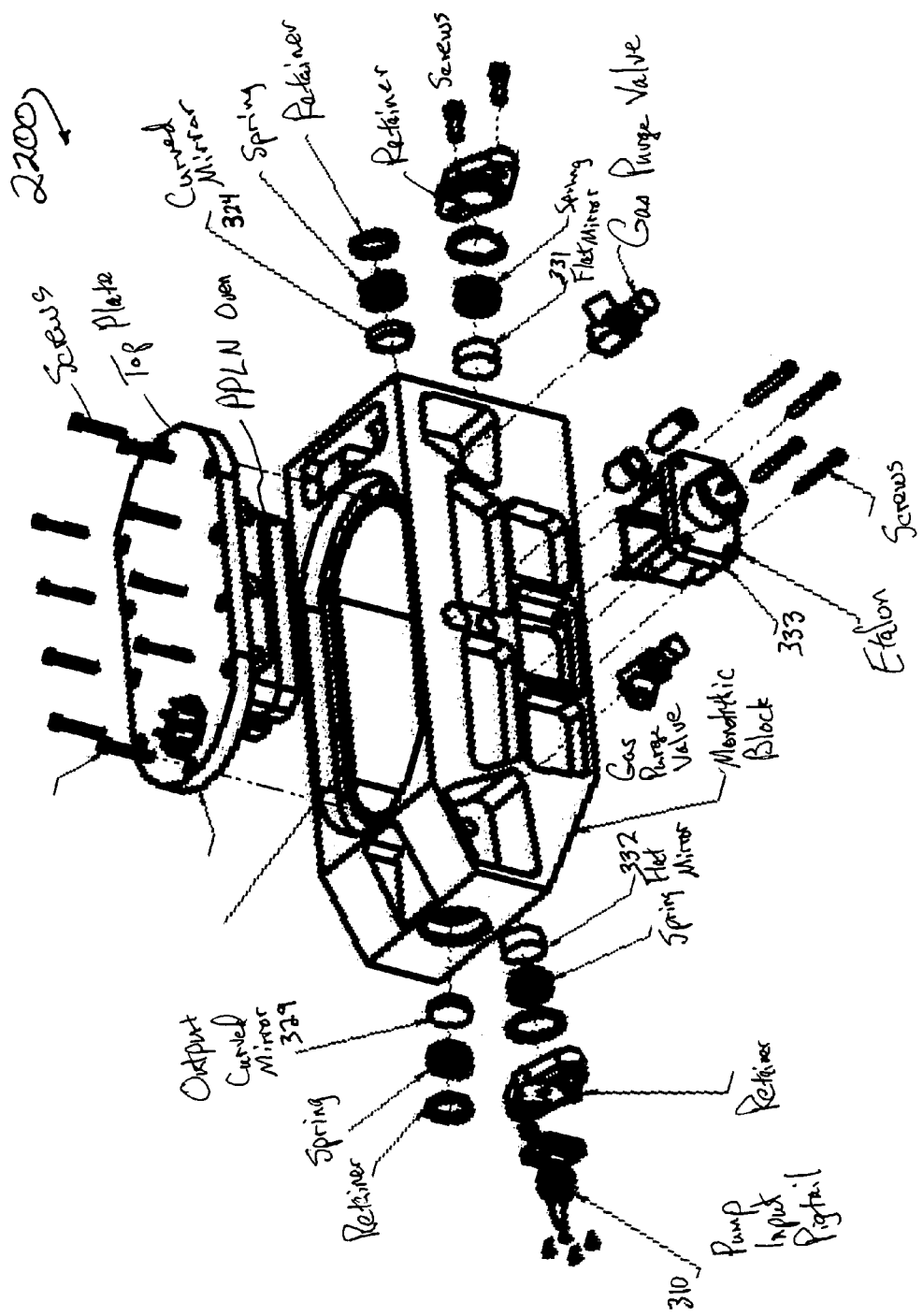
FIG. 23 is a perspective block diagram of four-mirror bow-tie OPO cavity design 2200.

FIG. 23 is a perspective block diagram of four-mirror bow-tie OPO cavity design 2200. This diagram implements the design of FIG. 22.

In some embodiments, the invention provides an apparatus that includes a continuous-wave optical-parametric oscillator configured to be pumped by a single frequency fiber laser.

In some embodiments, the invention provides an apparatus that includes a fiber-laser pump source that includes a distributed-feedback fiber laser and a fiber amplifier in a master-oscillator/power-amplifier configuration.

In some embodiments, the invention provides an apparatus that includes an optical parametric oscillator in which only signal wavelength is resonant.

In some embodiments, the invention provides an apparatus that includes an optical parametric oscillator in which signal and idler wavelengths are resonant.

In some embodiments, the invention provides an apparatus that includes an optical parametric oscillator in which pump and signal wavelengths are resonant.

In some embodiments, the invention provides an apparatus that includes a tuning mechanism for the fiber-laser-pumped optical parametric oscillator provided by continuous mode-hop-free tuning of the fiber laser.

In some embodiments, the invention provides a method for tuning a fiber laser that includes providing a DFB fiber laser, applying a variable voltage to a piezoelectric transducer attached to the DFB fiber laser, and varying the temperature of the fiber laser.

In some embodiments, the invention provides an apparatus that includes an OPO resonator, and means (as described above and equivalents thereof) for stabilizing an OPO amplitude by servo-control of the OPO resonator length to maintain resonance of the OPO on a specific longitudinal mode of pump, signal or idler wavelength.

In some embodiments, the invention provides a method for tuning an OPO that outputs light having an OPO amplitude, wherein the method includes providing one or more OPO-cavity mirrors, at least one of which has an attached piezoelectric element, and driving the piezoelectric element to stabilize the OPO amplitude.

In some embodiments, the invention provides an apparatus that includes a continuous-wave optical-parametric oscillator configured to be pumped by a single frequency fiber laser.

In some embodiments, the invention provides an apparatus that includes a fiber-laser pump source that includes a distributed-feedback fiber laser and a fiber amplifier in a master-oscillator/power-amplifier configuration.

In some embodiments, the invention provides an apparatus that includes an optical parametric oscillator in which only signal wavelength is resonant.

In some embodiments, the invention provides an apparatus that includes an optical parametric oscillator in which signal and idler wavelengths are resonant.

In some embodiments, the invention provides an apparatus that includes an optical parametric oscillator in which pump and signal wavelengths are resonant.

In some embodiments, the invention provides an apparatus that includes a tuning mechanism for the fiber-laser-pumped optical parametric oscillator provided by continuous mode-hop-free tuning of the fiber laser.

In some embodiments, the invention provides a method for tuning a fiber laser that includes providing a DFB fiber laser, applying a variable voltage to a piezoelectric transducer attached to the DFB fiber laser, and varying the temperature of the fiber laser.

In some embodiments, the invention provides an apparatus that includes an OPO resonator, and means (as described above and equivalents thereof) for stabilizing an OPO amplitude by servo-control of the OPO resonator length to maintain resonance of the OPO on a specific longitudinal mode of pump, signal or idler wavelength.

In some embodiments, the invention provides a method for tuning an OPO that outputs light having an OPO amplitude, wherein the method includes providing one or more OPO-cavity mirrors, at least one of which has an attached piezoelectric element, and driving the piezoelectric element to stabilize the OPO amplitude.

In some embodiments, the present invention provides an apparatus that includes a continuous-wave optical-parametric oscillator configured to be pumped by a fiber laser. In some such embodiments the fiber laser is a single-frequency fiber laser. In some such embodiments the fiber laser is a tunable single-frequency fiber laser. In some such embodiments the fiber laser is a tunable single-frequency fiber laser that is tunable by stretching a DFB component of the fiber laser. In some such embodiments the fiber laser is a tunable single-frequency fiber laser that is tunable by stretching a DFB component of the fiber laser using a PZT. In some such embodiments the fiber laser is a tunable single-frequency fiber laser that is tunable by stretching a DFB component of the fiber laser using a temperature change. In some such embodiments the fiber laser is a tunable single-frequency fiber laser that is tunable by stretching a DFB component of the fiber laser using a PZT and using a temperature change.

In some embodiments, the present invention provides an apparatus that includes a fiber-laser pump source that includes a distributed-feedback fiber laser and a fiber amplifier in a master-oscillator/power-amplifier configuration. In some such embodiments the apparatus further includes an OPO whose output wavelength varies based on a wavelength change of the fiber-laser pump source. In some such embodiments the apparatus further includes an OPO having a substantially fixed signal light wavelength, and an idler light output whose wavelength varies based on a wavelength change of the fiber-laser pump source. In some such embodiments the fiber laser is a tunable single-frequency fiber laser that is tunable by stretching a DFB component of the fiber laser the fiber laser is a tunable single-frequency fiber laser that is tunable by stretching a DFB component of the fiber laser using a PZT. In some such embodiments the fiber laser is a tunable single-frequency fiber laser that is tunable by stretching a DFB component of the fiber laser using a temperature change. In some such embodiments the fiber laser is a tunable single-frequency fiber laser that is tunable by stretching a DFB component of the fiber laser using a PZT and using a temperature change.

In some embodiments, the present invention provides an apparatus that includes a fiber-laser pump source that includes a distributed-feedback fiber laser having sufficient power to achieve OPO oscillation in an optical parametric oscillator.

In some embodiments, the present invention provides an apparatus that includes an optical parametric oscillator in which only signal wavelength is resonant.

In some embodiments, the present invention provides an apparatus that includes an optical parametric oscillator in which signal and idler wavelengths are resonant.

In some embodiments, the present invention provides an apparatus that includes an optical parametric oscillator in which pump and signal wavelengths are resonant.

In some embodiments, the present invention provides an apparatus that includes a tuning mechanism for a fiber-laser-pumped optical parametric oscillator provided by continuous mode-hop free tuning of a fiber laser.

In some embodiments, the present invention provides a method for tuning a fiber laser that includes providing a DFB fiber laser, applying a variable voltage to a piezoelectric transducer attached to the DFB fiber laser, and varying a temperature of the fiber laser.

In some embodiments, the present invention provides a method for tuning a fiber laser that includes providing a DFB fiber laser, and applying a variable voltage to a piezoelectric transducer attached to the DFB fiber laser.

In some embodiments, the present invention provides a method for tuning a fiber laser that includes providing a DFB fiber laser, and varying a temperature of the fiber laser.

In some embodiments, the present invention provides an apparatus that includes an OPO resonator, and means for stabilizing an OPO amplitude by servo-control of a length of the OPO resonator in order to maintain resonance of the OPO on a specific longitudinal mode of pump, signal or idler wavelength.

In some embodiments, the present invention provides an apparatus that includes an OPO resonator, and means for stabilizing an OPO amplitude by servo-control of a length of the OPO resonator in order to maintain resonance of the OPO on a specific longitudinal mode of pump wavelength.

In some embodiments, the present invention provides an apparatus that includes an OPO resonator, and means for stabilizing an OPO amplitude by servo-control of a length of the OPO resonator in order to maintain resonance of the OPO on a specific longitudinal mode of signal wavelength.

In some embodiments, the present invention provides an apparatus that includes an OPO resonator, and means for stabilizing an OPO amplitude by servo-control of a length of the OPO resonator in order to maintain resonance of the OPO on a specific longitudinal mode of idler wavelength.

In some embodiments, the present invention provides an apparatus that includes an OPO resonator, and means for stabilizing an OPO amplitude by servo-control of a length of the OPO resonator in order to maintain resonance of the OPO on a specific longitudinal mode of pump and signal wavelength.

In some embodiments, the present invention provides an apparatus that includes an OPO resonator, and means for stabilizing an OPO amplitude by servo-control of a length of the OPO resonator in order to maintain resonance of the OPO on a specific longitudinal mode of pump and idler wavelength.

In some embodiments, the present invention provides an apparatus that includes an OPO resonator, and means for stabilizing an OPO amplitude by servo-control of a length of the OPO resonator in order to maintain resonance of the OPO on a specific longitudinal mode of signal and idler wavelength.

In some embodiments, the present invention provides a method for tuning an OPO that includes providing one or more OPO-cavity mirrors, at least one of which has an attached piezoelectric element, and driving the piezoelectric element to stabilize an OPO amplitude.

In some embodiments, the present invention provides a method that includes continuous tuning of a DFB fiber laser, and simultaneously maintaining one or more OPO resonant wavelengths at fixed values. In some such embodiments the maintaining of the resonant wavelengths includes fixing of the resonant signal wavelength by using an intracavity mode-selection device. In some such embodiments the intracavity mode-selection device includes an etalon, wherein all of the frequency variation applied to the pump is directly transferred to the idler frequency without requiring control of the OPO cavity length. In some such embodiments the continuous tuning of the DFB fiber laser includes adjusting a DFB parameter by PZT adjustment. In some such embodiments the continuous tuning of the DFB fiber laser includes adjusting a DFB parameter by temperature adjustment. In some such embodiments the continuous tuning of the DFB fiber laser includes adjusting a DFB parameter by PZT and temperature adjustment.

In some embodiments, the present invention provides a method that includes synchronously adjusting an intracavity frequency selection element in an OPO, and synchronously adjusting a cavity length of the OPO. In some such embodiments the adjusting the cavity length of the OPO includes varying a voltage applied to a PZT attached to a cavity mirror of the OPO, so that signal and idler wavelengths tune smoothly without mode hops, while pump wavelength remains fixed.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. For example, the OPO may be operated with either signal and idler resonant or pump and signal resonant rather than in the singly resonant configuration described above. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
 a continuous-wave optical-parametric oscillator configured to be pumped by a fiber laser, and configured as a ring having an optical path along the ring, wherein between one percent and five percent of light at a resonant wavelength of the optical-parametric oscillator is removed from the optical-parametric oscillator's ring optical path on each round trip of the light at the resonant wavelength around the ring of the optical-parametric oscillator.

2. The apparatus of claim 1, further comprising the fiber laser, wherein the fiber laser is a single-frequency fiber laser.

3. The apparatus of claim 1, further comprising the fiber laser, wherein the fiber laser is a tunable single-frequency fiber laser.

4. The apparatus of claim 1, further comprising the fiber laser, wherein the fiber laser is a tunable single-frequency distributed feedback (DFB) fiber laser that is tunable by stretching a DFB component of the fiber laser.

5. The apparatus of claim 1, further comprising the fiber laser, wherein the fiber laser is a tunable single-frequency distributed feedback (DFB) fiber laser that is tunable by stretching a DFB component of the fiber laser using a PZT.

6. The apparatus of claim 1, further comprising the fiber laser, wherein the fiber laser is a tunable single-frequency distributed feedback (DFB) fiber laser that is tunable by stretching a DFB component of the fiber laser using a temperature change.

7. The apparatus of claim 1, further comprising the fiber laser, wherein the fiber laser is a tunable single-frequency distributed feedback (DFB) fiber laser that is tunable by stretching a DFB component of the fiber laser using a PZT and using a temperature change.

8. The apparatus of claim 1, further comprising a fiber amplifier, wherein the fiber laser is a distributed-feedback fiber laser, wherein the fiber amplifier is optically coupled to receive laser light from the distributed-feedback fiber laser and amplify the light in a master-oscillator/power-amplifier configuration, and wherein the output from the fiber amplifier is operatively coupled to pump the optical-parametric oscillator.

9. The apparatus of claim 1, further comprising the fiber laser, wherein the fiber laser is operatively coupled to pump the optical-parametric oscillator.

10. The apparatus of claim 1, wherein the optical path around the ring includes a bow-tie configuration.

11. The apparatus of claim 1, further comprising the fiber laser, the fiber laser further comprising an optical master-oscillator/power-amplifier (MOPA) that includes a distributed-feedback fiber laser in the MOPA's master oscillator and a fiber amplifier in the MOPA's power amplifier, wherein the fiber amplifier is optically coupled to receive laser light from the distributed-feedback fiber laser and amplify the light in a master-oscillator/power-amplifier configuration, and wherein the output from the fiber amplifier is operatively coupled to pump the optical-parametric oscillator.

12. An apparatus comprising:
a fiber laser that outputs laser light;
a continuous-wave optical-parametric oscillator configured to be pumped by the fiber laser, wherein the fiber laser is operatively coupled to pump the optical-parametric oscillator, and wherein between one percent and 5 percent of light at a resonant wavelength of the optical-parametric oscillator is removed from the optical-parametric oscillator on each round trip of the light at the resonant wavelength through the optical-parametric oscillator.

13. An apparatus comprising:
a fiber laser that outputs laser light;
a continuous-wave optical-parametric oscillator configured to be pumped by the fiber laser, wherein the fiber laser is operatively coupled to pump the optical-parametric oscillator, and wherein between one percent and 5 percent of light at a resonant wavelength of the optical-parametric oscillator is removed from the optical-parametric oscillator on each round trip of the light at the resonant wavelength through the optical-parametric oscillator, wherein pump power from the fiber laser that is delivered to the optical-parametric oscillator is about 2.5 times a threshold power of the optical-parametric oscillator.

14. An apparatus comprising:
a distributed feedback (DFB) fiber laser;
a continuous-wave optical-parametric oscillator configured to be pumped by the DFB fiber laser, the optical-parametric oscillator further comprising:
an optical resonator;
a circulating signal having a circulating signal power traveling in the optical resonator;
a pump-light input port, optically coupled to receive the pump light from the DFB fiber laser, the pump light having a pump-light wavelength and a pump-light power;
a signal-light output port configured to output a signal-light beam having a substantially fixed signal-light wavelength and a signal-light power from the optical resonator; and
an idler-light output port configured to output an idler-light beam having an idler-light wavelength and an idler-light power from the optical resonator, wherein the idler-light wavelength varies based on a change in the pump-light wavelength.

15. The apparatus of claim 14, wherein the idler light beam has an $M^2$ of about 1.00 to 1.01.

16. The apparatus of claim 14, wherein the optical-parametric oscillator has an output mirror that transmits between about two percent and about six percent of the signal light power.

17. The apparatus of claim 14, wherein the optical-parametric oscillator has an output mirror that transmits about four percent of the signal light power.

18. The apparatus of claim 14, wherein the optical-parametric oscillator has a conversion efficiency of about 60 percent.

19. An apparatus comprising:
a distributed feedback (DFB) fiber laser;
a continuous-wave optical-parametric oscillator configured to be pumped by the DFB fiber laser, the optical-parametric oscillator further comprising:
an optical resonator;
a circulating signal having a circulating signal power traveling in the optical resonator;
a pump-light input port, optically coupled to receive the pump light from the DFB fiber laser, the pump light having a pump-light wavelength and a pump-light power;
a signal-light output port configured to output a signal-light beam having a substantially fixed signal-light wavelength and a signal-light power from the optical resonator; and
an idler-light output port configured to output an idler-light beam having an idler-light wavelength and an idler-light power from the optical resonator, wherein the idler-light wavelength varies based on a change in the pump-light wavelength, wherein about four percent of the signal light is transmitted through an output mirror and wherein the signal-light power of the output signal-light beam is at least about four Watts, such that the circulating signal power is limited to about 100 Watts.

20. An apparatus comprising:
a distributed feedback (DFB) fiber laser;
a continuous-wave optical-parametric oscillator configured to be pumped by the DFB fiber laser, the optical-parametric oscillator further comprising:
an optical resonator;
a circulating signal having a circulating signal power traveling in the optical resonator;
a pump-light input port, optically coupled to receive the pump light from the DFB fiber laser, the pump light having a pump-light wavelength and a pump-light power;
a signal-light output port configured to output a signal-light beam having a substantially fixed signal-light wavelength and a signal-light power from the optical resonator; and
an idler-light output port configured to output an idler-light beam having an idler-light wavelength and an idler-light power from the optical resonator, wherein the idler-light wavelength varies based on a change in the pump-light wavelength, and
an optical filter, wherein the pump light and the idler light are separated using the filter, wherein the filter transmits substantially all of the idler light and reflects substantially all of the pump light.

21. An apparatus comprising:
a distributed feedback (DFB) fiber laser;

a continuous-wave optical-parametric oscillator configured to be pumped by the DFB fiber laser, the optical-parametric oscillator further comprising:
an optical resonator;
a circulating signal having a circulating signal power traveling in the optical resonator;
a pump-light input port, optically coupled to receive the pump light from the DFB fiber laser, the pump light having a pump-light wavelength and a pump-light power;
a signal-light output port configured to output a signal-light beam having a substantially fixed signal-light wavelength and a signal-light power from the optical resonator; and
an idler-light output port configured to output an idler-light beam having an idler-light wavelength and an idler-light power from the optical resonator, wherein the idler-light wavelength varies based on a change in the pump-light wavelength, wherein the optical-parametric oscillator further includes a wavelength-selective filter operatively coupled to filter the signal-light beam and substantially fix the signal-light wavelength.

22. An apparatus comprising:
a fiber-laser pump source that includes a distributed-feedback fiber laser and a fiber amplifier in a master-oscillator/power-amplifier configuration; and
a continuous-wave optical-parametric oscillator operatively coupled to the fiber-laser pump source and configured to be pumped by pump light from the fiber-laser pump source, wherein between one percent and five percent of light at a resonant wavelength of the optical-parametric oscillator is removed from the optical-parametric oscillator on each round trip of the light at the resonant wavelength through the optical-parametric oscillator.

23. The apparatus of claim 22, wherein the output wavelength of the optical-parametric oscillator (OPO) varies based on a wavelength change of the fiber-laser pump source.

24. The apparatus of claim 22, wherein the optical-parametric oscillator (GPO) has a substantially fixed signal light wavelength, and an idler light output whose wavelength varies based on a wavelength change of the fiber-laser pump source.

25. The apparatus of claim 22, wherein the fiber laser is a tunable single-frequency fiber laser that is tunable by stretching a DFB component of the fiber laser.

26. The apparatus of claim 22, wherein the fiber laser is a tunable single-frequency fiber laser that is tunable by stretching a DFB component of the fiber laser using a piezoelectric transducer (PZT).

27. The apparatus of claim 22, wherein the fiber laser is a tunable single-frequency fiber laser that is tunable by stretching a DFB component of the fiber laser using a temperature change.

28. The apparatus of claim 22, wherein the fiber laser is a tunable single-frequency fiber laser that is tunable by stretching a DFB component of the fiber laser using a piezoelectric transducer (PZT) and using a temperature change.

* * * * *

UNITED STATES PATENT AND TRADEMARK OFFICE
CERTIFICATE OF CORRECTION

PATENT NO. : 7,620,077 B2
APPLICATION NO. : 11/484358
DATED : November 17, 2009
INVENTOR(S) : Angus J. Henderson It is certified that error appears in the above-identified patent and that said Letters Patent is hereby corrected as shown below:

In Column 30, Line 10 (line 2 of claim 24):
Delete "(GPO)" and insert
--(OPO)-- therefor.

Signed and Sealed this

Twelfth Day of January, 2010

David J. Kappos
*Director of the United States Patent and Trademark Office*